US007366696B1

(12) United States Patent
Ganesan et al.

(10) Patent No.: US 7,366,696 B1
(45) Date of Patent: Apr. 29, 2008

(54) ELECTRONIC BILLING WITH FLEXIBLE BILLER CONTROLLED ELECTRONIC BILL PRESENTMENT

(75) Inventors: Ravi Ganesan, Norcross, GA (US); Kenneth Hobday, Powell, OH (US)

(73) Assignee: CheckFree Corporation, Norcross, GA (US)

( * ) Notice: Subject to any disclaimer, the term of this patent is extended or adjusted under 35 U.S.C. 154(b) by 0 days.

(21) Appl. No.: 09/414,731

(22) Filed: Oct. 8, 1999

(51) Int. Cl.
*G06Q 40/00* (2006.01)

(52) U.S. Cl. .............................. 705/40; 705/39; 705/35

(58) Field of Classification Search ................. 705/40, 705/39, 35
See application file for complete search history.

(56) References Cited

U.S. PATENT DOCUMENTS

| | | | |
|---|---|---|---|
| 4,277,837 A | 7/1981 | Stuckert | 364/900 |
| 4,319,336 A | 3/1982 | Anderson et al. | 364/900 |
| 4,460,960 A | 7/1984 | Anderson et al. | 364/200 |
| 5,007,084 A | 4/1991 | Materna et al. | |
| 5,025,373 A | 6/1991 | Keyser, Jr. et al. | 364/408 |
| 5,220,501 A | 6/1993 | Lawlor et al. | 364/408 |
| 5,231,571 A | 7/1993 | D'Agostino | 364/408 |
| 5,283,829 A | 2/1994 | Anderson | 380/24 |
| 5,287,270 A | 2/1994 | Hardy et al. | 364/408 |
| 5,325,290 A | 6/1994 | Cauffman et al. | 364/401 |
| 5,326,959 A | 7/1994 | Perazza | 235/379 |
| 5,336,870 A | 8/1994 | Hughes et al. | 235/379 |
| 5,341,429 A | 8/1994 | Stringer et al. | 380/23 |
| 5,347,632 A | 9/1994 | Filepp et al. | 395/200 |
| 5,383,113 A | 1/1995 | Kight et al. | 364/401 |
| 5,420,405 A | 5/1995 | Chasek | 235/379 |
| 5,465,206 A | 11/1995 | Hilt et al. | 364/406 |

(Continued)

FOREIGN PATENT DOCUMENTS

DE      19539617 A1    10/1994

(Continued)

OTHER PUBLICATIONS

Laura Lemay, Teach Yourself Web Publishing with HTML 3.0 in a Week, 1996, Sams.net pp. 4-11 and 114-115.*

(Continued)

*Primary Examiner*—Kambiz Abdi
*Assistant Examiner*—Jennifer Liversedge
(74) *Attorney, Agent, or Firm*—Sutherland Asbill & Brennan LLP

(57) ABSTRACT

An electronic bill presentment network includes a central network station and a plurality of different user stations. The central network station transmits bill availability information to the user stations to identify available bills of different billers for the different users. Information associated with each available bill of a respective biller is available at one of multiple networks addresses associated with that biller. The associated information could, for example, be the bill itself and/or promotional information. Each user station is associated with a respective one of the users and receives the transmitted bill availability information for its associated user and selects one of the identified available bills, such as for viewing or payment. A user station associated with a first user is linked to the first network address associated with the bills of the first biller, based on a bill selection by the first user station. A second user station associated with a second user is linked to the second network address associated with the bills of the first biller based on a bill selection by the second user station.

24 Claims, 35 Drawing Sheets

U.S. PATENT DOCUMENTS

| | | | |
|---|---|---|---|
| 5,473,143 A | 12/1995 | Vak et al. | |
| 5,483,445 A | 1/1996 | Pickering | 364/406 |
| 5,594,910 A | 1/1997 | Filepp et al. | 395/800 |
| 5,649,117 A | 7/1997 | Landry | |
| 5,655,089 A | 8/1997 | Bucci | 395/240 |
| 5,699,528 A | 12/1997 | Hogan | 395/240 |
| 5,710,889 A | 1/1998 | Clark et al. | 395/244 |
| 5,727,249 A | 3/1998 | Pollin | 705/40 |
| 5,794,221 A | 8/1998 | Egendorf | |
| 5,815,665 A | 9/1998 | Teper et al. | 395/200.59 |
| 5,832,460 A | 11/1998 | Bednar et al. | |
| 5,884,288 A | 3/1999 | Chang et al. | 705/40 |
| 5,943,656 A | 8/1999 | Crooks et al. | 705/30 |
| 5,956,700 A | 9/1999 | Landry | |
| 5,963,925 A | 10/1999 | Kolling et al. | 705/40 |
| 5,978,780 A | 11/1999 | Watson | |
| 6,035,285 A | 3/2000 | Schlect et al. | |
| 6,044,362 A | 3/2000 | Neely | |
| 6,055,567 A | 4/2000 | Ganesan et al. | |
| 6,070,150 A * | 5/2000 | Remington et al. | 705/34 |
| 6,078,907 A | 6/2000 | Lamm | |
| 6,128,603 A | 10/2000 | Dent et al. | |
| 6,173,272 B1 | 1/2001 | Thomas et al. | |
| 6,188,994 B1 | 2/2001 | Egendorf | |
| 6,285,991 B1 | 9/2001 | Powar | |
| 6,289,322 B1 | 9/2001 | Kitchen et al. | |
| 6,292,789 B1 | 9/2001 | Schutzer | |
| 6,304,857 B1 | 10/2001 | Heindel et al. | |
| 6,374,229 B1 | 4/2002 | Lowrey et al. | |
| 2001/0032181 A1 | 10/2001 | Jakstadt et al. | |
| 2001/0037240 A1 | 11/2001 | Marks et al. | |
| 2001/0037295 A1 | 11/2001 | Olsen | |
| 2002/0002536 A1 | 1/2002 | Braco | |
| 2002/0007320 A1 | 1/2002 | Hogan et al. | |
| 2002/0019808 A1 | 2/2002 | Sharma | |
| 2002/0023041 A1 | 2/2002 | Brett | |
| 2002/0023055 A1 | 2/2002 | Antognini et al. | |
| 2002/0029248 A1 | 3/2002 | Cook et al. | |
| 2002/0065772 A1 | 5/2002 | Saliba et al. | |
| 2002/0069163 A1 | 6/2002 | Gilbert | |
| 2002/0069168 A1 | 6/2002 | Lee et al. | |
| 2005/0197957 A1 | 9/2005 | Keith et al | |
| 2005/0203835 A1 | 9/2005 | Nhaissi et al. | |

FOREIGN PATENT DOCUMENTS

| | | | |
|---|---|---|---|
| EP | 0370146 A1 | | 5/1990 |
| EP | 0745947 A2 | | 12/1996 |
| WO | WO97/24680 | * | 7/1997 |
| WO | WO99/10823 | | 3/1999 |
| WO | WO00/48102 | | 8/2000 |

OTHER PUBLICATIONS

Wall Street *E Banking, Jan. 7, 1997, Internet, pp. 1-3.*
Open Financial Exchange Bill Presentment, Jun. 12, 1997, 1997 CheckFree Corp., Intuit Inc., Microsoft Corp., pp. 312-356.
Ostrow, Jessica. "MSFDC Puts Financial Institutions at the Heart of Internet Bill Presentment and Payment." Journal of Retail Banking Service, Autumn 1998, p. 1, vol. 20, iss. 3.
Disclosure Under 1.56.

* cited by examiner

| Customer | Biller #1 | | Biller #2 | | Biller #3 | | | | | | | Biller #n |
|---|---|---|---|---|---|---|---|---|---|---|---|---|
| | Bill Avail | Flag | Bill Avail | Flag | Bill Avail | Flag | | | | | | |
| A | Y | F | Y | | | | | | | | | |
| B | Y | | | | | | | | | | | |
| C | | | Y | F | Y | | | | | | | |
| → | | | | | | | | | | | | |
| n | | | | | | | | | | | | |

Figure 22A

| Biller | First Network Address | Second Network Address |
|---|---|---|
| #1 | URL 1A | URL 1B |
| #2 | URL 2A | URL 2B |
| #3 | URL 3 | |
| | | |
| | | |
| | | |
| | | |
| | | |
| | | |
| n | | |

Figure 22B

ELECTRONIC BILLING WITH FLEXIBLE BILLER CONTROLLED ELECTRONIC BILL PRESENTMENT

RELATED APPLICATIONS

This application is related to pending application Ser. No. 09/017,169, entitled "Distributed Data Accessing Technique", filed Feb. 2, 1998.

FIELD OF THE INVENTION

The present invention relates to electronic bill presentment and more particularly to electronic billing with flexible, biller controlled, electronic bill presentment.

BACKGROUND OF THE INVENTION

There are two prevalent models for electronic bill presentment that are currently used in industry. The first is an aggregation model 10, which is shown in FIG. 1. In its simplest form, the aggregation model 10 includes a customer 12, an aggregator 14, and a plurality of billers 16. The customer 12 can be, for example, an individual person, a family, or a business. The aggregator 14 can be a financial institution (FI) such as, for example, a bank. Alternatively, the aggregator 14 can be a separate entity which acts of behalf of a sponsor 18, which can also be an FI such as a bank. Each biller 16 can be of any billing institution type such as, for example, a local telephone company, a local electric company, a retail outlet, or a national long distance telephone company.

Each biller 16 provides customer-related invoice data to the aggregator 14. The aggregator 14 serves as an intermediary between each biller 16 and the customer 12 by providing bill presentment directly to the customer 12, potentially on behalf of the sponsor 18.

There are two variants of the aggregation model 10 resulting from the ownership, or "branding", of the presentation experience and the communication channel between the aggregator 14 and the customer 12. In one variant, the aggregator 14 may offer aggregator branding, thus totally owning both the presentation experience and the communication channel between the aggregator 14 and the customer 12. In the other variant, the aggregator 14 may offer sponsor-branding, thus staying "behind the scenes" in terms of the presentation experience and supporting the communication channel between the aggregator 14 and the customer 12 on behalf of the sponsor 18.

The second prevalent model for electronic bill presentment is a biller direct model 20, which is shown in FIG. 2. In its simplest form, the biller direct model 20 includes a customer 12 and at least one biller 16. In the biller direct model 20, each biller 16 retains the customer-related invoice data and the full relationship with the customer 12 (i.e., the presentation experience and the communication channel). The customer 12 may have software for providing a capability similar to Web browser bookmarking so as to allow easy navigation between billers, and thus some level of virtual aggregation. However, there is no actual aggregation such as with the aggregator 14 of the aggregation model 10 described above.

The above-described models present a dichotomy between a sponsor-centric view and a biller-centric view of bill presentment. That is, the aggregation model 10 allows the aggregator 14 and/or the sponsor 18 to use customer-related invoice data, bill presentment, and the communication channel between the aggregator 14 and the customer 12 for cross-selling or other peripheral services. The biller direct model 20, on the other hand, insures that control of customer-related invoice data, bill presentment, and the communication channel between the biller 16 and the customer 12 remains with the biller 16.

Also, neither of the above-described models adopt a truly customer-centric view. That is, neither of the above-described models allow a customer 12 to interact directly with individual billers 16 while retaining the benefits of interacting with a single aggregator 14 such as, for example, the ability to retain a single authentication and log-in procedure and a common bill presentation framework. Further, neither of the above-described models allow a customer 12 to retain the benefits of interacting with a single aggregator 14 while allowing the aggregator 14, billers 16, and sponsor 18 to retain certain preferences such as, for example, the ability to retain control of customer-related data and a communication channel with each customer 12. Accordingly, it would be desirable to provide a distributed data accessing technique which addresses the above-mentioned shortcomings of the above-described models.

OBJECTS OF THE INVENTION

One object of the present invention is to provide a distributed data accessing technique that allows a customer to interact directly with individual billers while retaining the benefits of interacting with a single aggregator.

Another object of the present invention is to provide a distributed data accessing technique that allows a customer to retain the benefits of interacting with a single aggregator while allowing the aggregator, billers, and sponsor to retain control of customer-related data and a communication channel with each customer.

Another object of the present invention is to provide a distributed data accessing technique that allows complete flexibility as to who is offering bill presentment: billers only, aggregator only (possibly on behalf of one or more sponsors), or some combination of the above.

Another object of the present invention is to provide a distributed data accessing technique that allows the biller greater flexibility in the presenting supplemental information, such as promotional materials, to customers as part of the electronic bill presentment and/or payment process.

The above-stated objects, as well as other objects, features, and advantages, of the present invention will become readily apparent from the following detailed description which is to be read in conjunction with the appended drawings.

SUMMARY OF THE INVENTION

In accordance with the invention, an electronic bill presentment network includes a central network station, preferably a network server, and multiple user stations, each associated with one of multiple different users. The user stations could be personal computers or other network devices. The stations may be interconnected by virtually any type of network, although preferably the stations are interconnected and communicate via the Internet.

The central network station is configured, e.g. programmed, to transmit bill availability information via the network, typically responsive to requests from the user stations. A database is beneficially provided to store the bill availability information which will be transmitted by the central network station. The database may be located on a network memory at the central station or elsewhere on the network. Preferably, the user stations transmit requests for the bill availability information and the central network station transmits the bill availability information responsive thereto. The transmitted bill availability information identifies available bills of different billers for the different users. The bill availability information may identify the available bills with or without providing bill summary information, such as the amount of each, or all, of the identified bills for a user.

Each available bill of a respective biller is available at one of multiple network addresses associated with the applicable biller. These addresses could be different network addresses at one or more network sites controlled by the biller, or different addresses at different network sites controlled by different entities other than the biller, or different addresses at a combination of biller controlled and other entity controlled network sites. The network addresses themselves and/or indicators of the applicable address are preferably also stored in the database.

The network will typically include multiple different biller stations. Each biller station is typically associated with a respective biller, although this is not mandatory and a single station could represent multiple billers. The biller station will generally be implemented as a network server. Hence, the first network address discussed above could be a network address of the biller station associated with the applicable biller, while the second network address could be a network address associated with the central processing station.

Each user station is configured, e.g. programmed, to transmit requests, which may take the form of requests for bill availability information, to receive the transmitted bill availability information for its associated user, and to select one or more of the identified available bills. Identified available bills may be selected in order to, for example, generate a request(s) to view or pay the selected bill(s). Advantageously, each user station displays the transmitted bill availability information, and selects identified bills on the basis of received input of its associated user. Because a biller's bills are stored at more than one network address, a user station associated with a first user can be linked to a first network address associated a biller based on the selection of a bill of that biller by that user station, while another user station associated with a second user can be linked to a second network address associated with the same biller based on selection of another bill of that biller by the second user station.

Preferably, the transmitted bill availability information identifying the bill of the biller for the first user includes a hyperlink to the first network address and the availability information identifying the bill of the same biller for the second user includes a hyperlink to the second network address. In such a case, by simply clicking on the applicable bill availability information to select a bill, each user station is hyperlinked to the appropriate network address. Whether or not hyperlinks are utilized, the first user station is advantageously automatically linked to the first network address responsive to selection of the first bill, for example for viewing or payment, and the second user station is automatically linked to the second network address responsive to selection of the second bill.

According to an aspect of the invention, the information associated with the identified bill of the biller for the first user at the first network address is promotional information. On the other hand, the information associated with the identified bill of that same biller for the second user at the second network address excludes the promotional information. The promotional information could, for example, be a special offering which the biller is targeting to only certain of its customers, a survey which the biller is limiting to certain customers, a software upgrade which is required by only certain customers, or any other type of information which the biller wishes to present to only a selected portion of its customers. However, the associated information could be the bill itself, which might be presented to the first biller in a manner which provides an enriched bill presentation experience as compared to the bill presentation experience provided to the second biller and hence the network address to which a user is sent could relate primarily or even exclusively to the look and feel of the presentation.

In accordance with another aspect of the invention, each of the user stations is capable of generating a directive to view or pay a selected available bill(s) based on the bill availability information. It will be recognized that, in the case of pay directives, this will normally require that bill summary information, particularly the bill amount, be presented as part of the bill availability information. The user station can beneficially be linked, e.g. hyperlinked, to the first network address based on selecting a bill of the biller. Hence, in such an implementation the user station is linked to the first network address whether the bill itself or payment of the bill is requested by the user station during presentation of the bill availability information. In the case where the user station is linked to the first network address after a user inputs a pay bill command and hence after the user has found the bill acceptable, preferably only the promotional information, and not the full bill detail, is made available to the user station at the first network address.

According to still another aspect of the invention, the database for storing bill availability information includes identifiers of the different users along with the availability information for the bills of the different billers for the different users. The availability information for each of the available bills is associated with the identifier of one of the different users. The database also includes network location indicators. Each location indicator is associated with one or more of the different users and indicates a network location, e.g. a network address such as a URL, at which the identified available bills of one biller for those associated users are available. The locator is preferably a flag or other type indicator which is indicative of a network location different than the network location(s) at which the identified available bills of the biller for other of the users are available. However, the indicator could, if desired, be the location address itself.

It will also be understood by those skilled in the art, that the invention is easily implemented using computer software. More particularly, software can be easily programmed, using routine programming skill, based upon the description of the invention set forth herein and stored on a storage medium which is readable by a computer processor of the applicable component, e.g. a user station, a biller station or the central network station, to cause the processor to operate such that the particular component performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 22A depicts an EPCS database for storing bill availability information and flags for directing a user to a desired network address for bill presentation.

FIG. 22B depicts an EPCS database for storing different addresses at which bills of a biller are presented to different users.

DETAILED DESCRIPTION OF A PREFERRED EMBODIMENT

Figure 1:
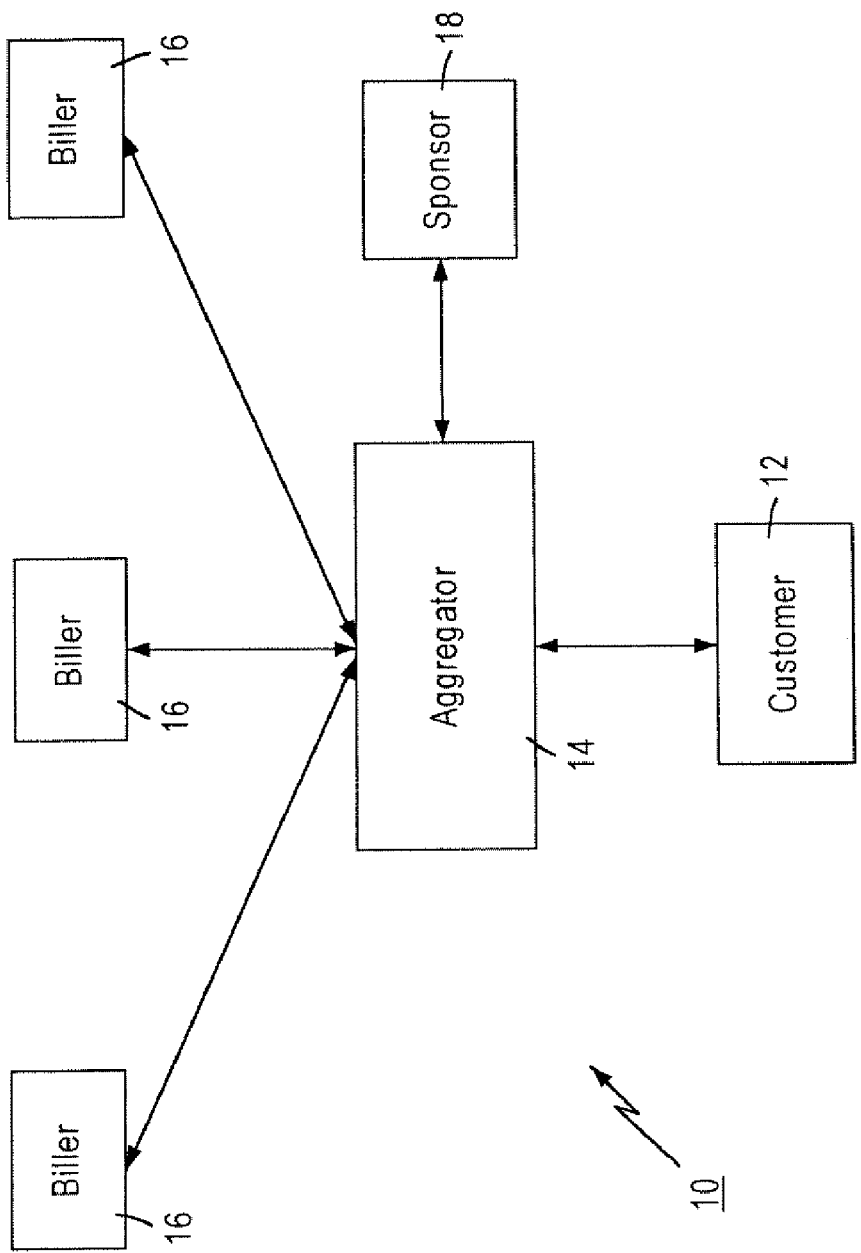
FIG. 1 is an aggregation model for electronic bill presentment.
Figure 2:
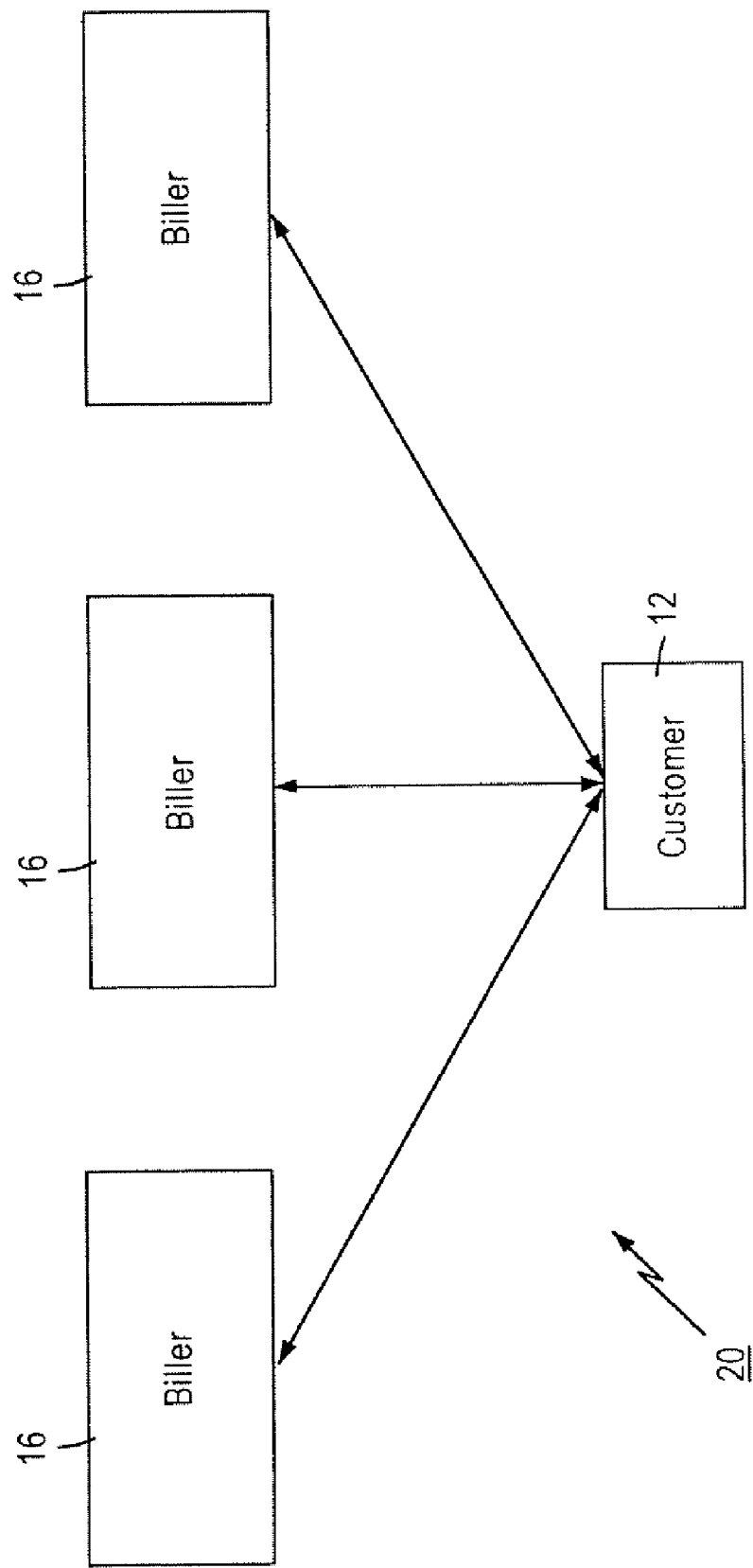
FIG. 2 is a biller direct model for electronic bill presentment.
Figure 3:
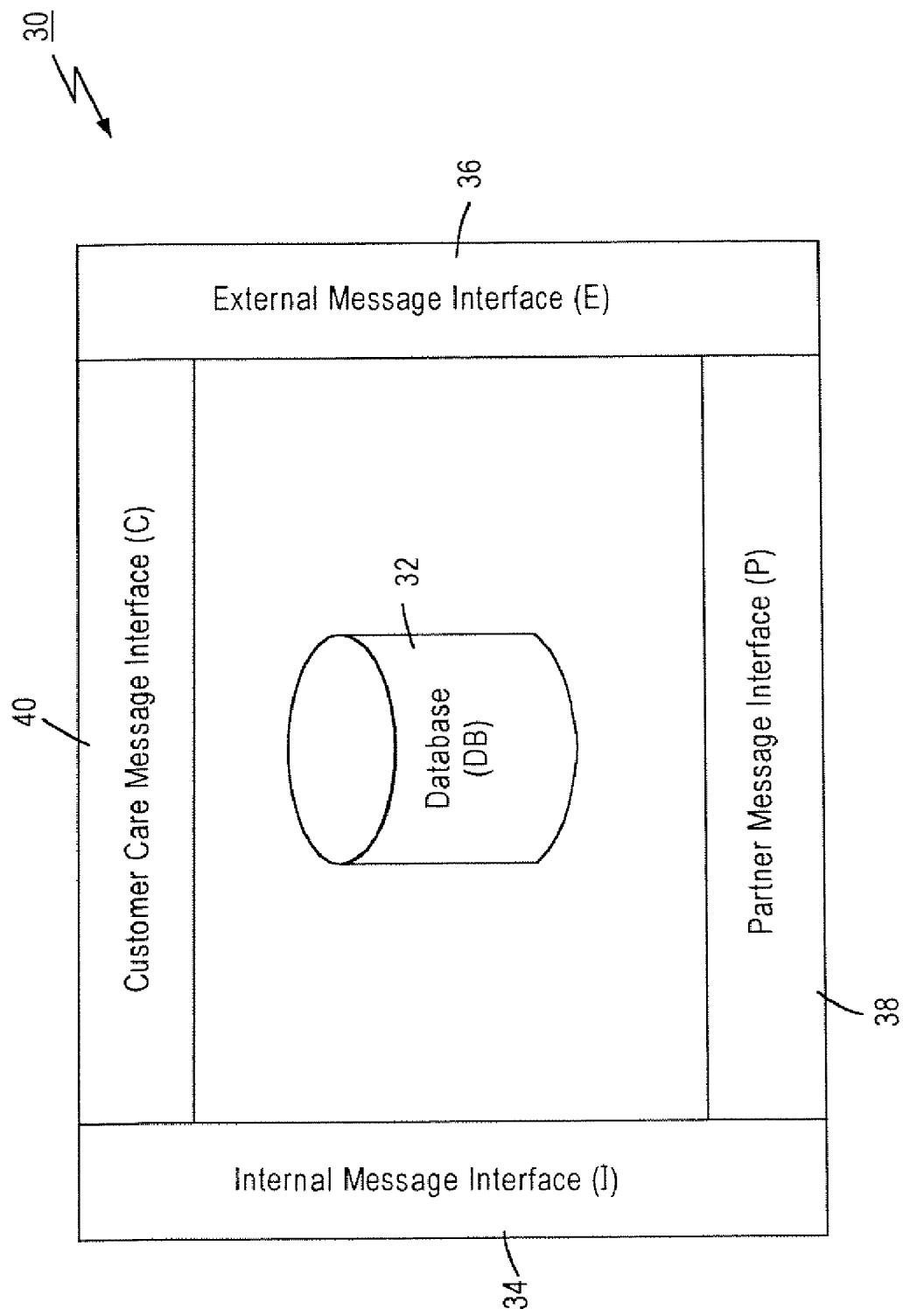
FIG. 3 is an infrastructure diagram of a distributed database entity in accordance with the present invention.

Referring to FIG. 3, there is shown an infrastructure diagram of a distributed database entity 30 in accordance with the present invention. The distributed database entity 30 comprises a database component 32 and a plurality of message interfaces 34–40 for facilitating communication between the database component 32 and other distributed database entities and system components. The database component 32 typically contains data that is controlled or "owned" by the controller or "owner" of the distributed database entity 30. For example, if the distributed database entity 30 is owned by a financial institution (FI) such as a bank, then the database component 32 could contain information such as checking and savings account balances. It should be noted, however, that the database component 32 can also contain data from other distributed database entities and system components, as will be described in detail below.

The plurality of message interfaces 34–40 includes an internal message interface 34, an external message interface 36, a partner message interface 38, and a customer care message interface 40. The internal message interface 34 defines messages that are used to communicate and query data between the given distributed database entity 30 and other distributed database entities, or other system components having an internal message interface. For example, in a bill presentment and payment system, communication between a banking entity and a billing entity may be required. The external message interface 36 defines messages that are used to communicate and query data between the given distributed database entity 30 and any existing system(s) that are directly related to the given distributed database entity 30. For example, an FI such as a bank can have an existing direct deposit account (DDA) system. The partner message interface 38 defines messages that are used to communicate and query data between the given distributed database entity 30 and any existing system(s) that are indirectly related to the given distributed database entity 30. For example, in a bill presentment and payment system, communication with an established billing aggregator may be necessary to satisfy customer demands. The customer care message interface 40 defines messages that are used to communicate and query data between the given distributed database entity 30 and a customer care entity. For example, in a bill presentment and payment system, a billing entity may allow a third party to access bill data in order to provide feedback to bill customers. It should be noted that all of the above-described interfaces will be described in greater detail below.

Figure 4:
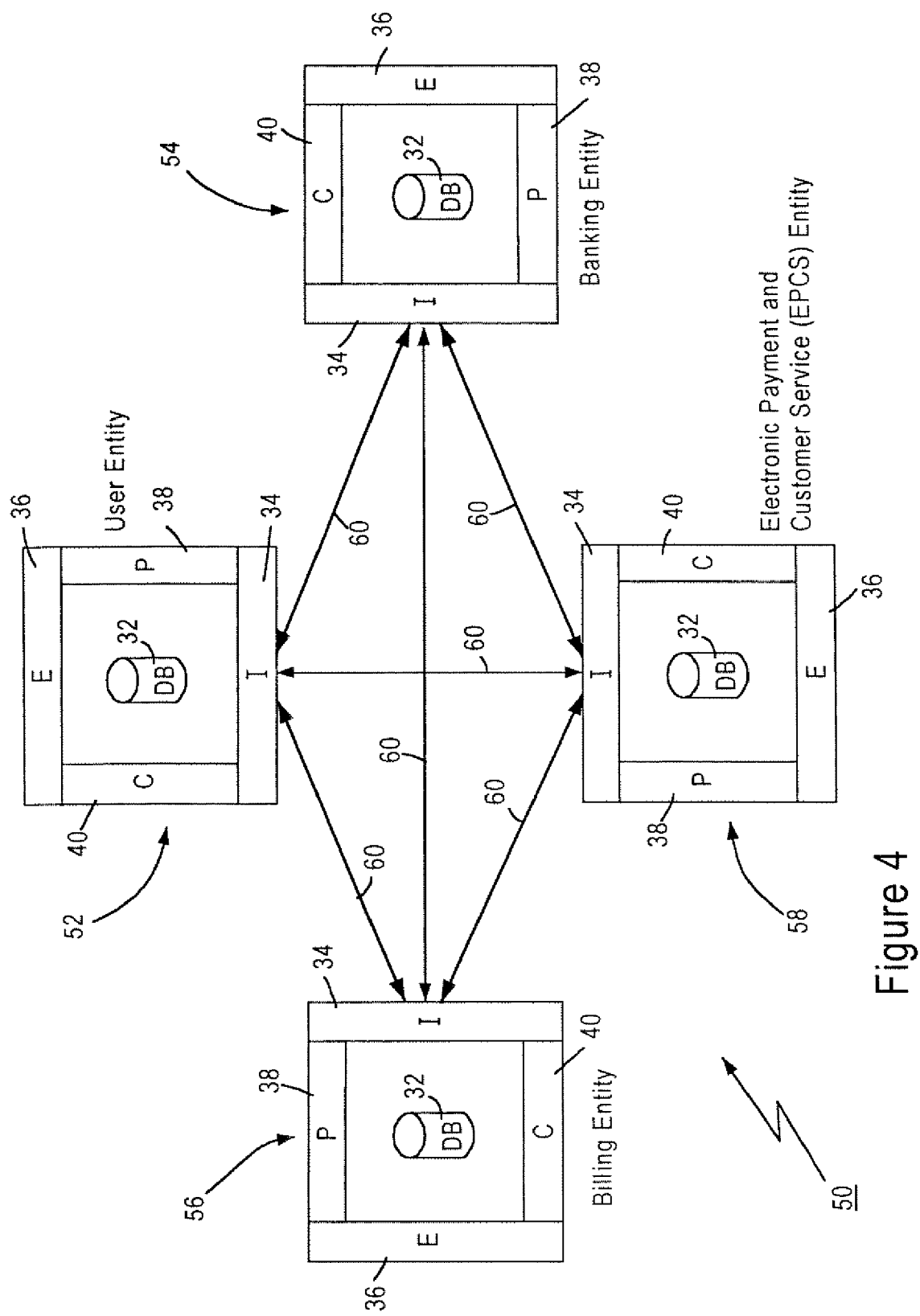
FIG. 4 is a schematic diagram of an electronic bill presentment and payment system in accordance with the present invention.

Referring to FIG. 4, there is shown a schematic diagram of a versatile electronic bill presentment and payment system 50 in accordance with the present invention. The system 50 comprises a user entity 52, an aggregator entity represented as a banking entity 54, a billing entity 56, and an electronic payment and customer service (EPCS) entity 58. It should be understood that the aggregator entity could be a portal, stock broker or other type entity if desired. For purposes of this detailed description, the user entity 52, the banking entity 54, the billing entity 56, and the EPCS entity 58 are each distributed database entities 30 as defined above. Thus, the user entity 52, the banking entity 54, the billing entity 56, and the EPCS entity 58 each has a database component 32, an internal message interface 34, an external message interface 36, a partner message interface 38, and a customer care message interface 40. It should be noted, however, that the user entity 52, the banking entity 54, the billing entity 56, and the EPCS entity 58 are not required to have a database component 32, an internal message interface 34, an external message interface 36, a partner message interface 38, and a customer care message interface 40. That is, the user entity 52, the banking entity 54, the billing entity 56, and the EPCS entity 58 are only required to have an internal message interface 34 so that communications can take place between each entity.

At this point it should be noted that, although only a single user entity 52, banking entity 54, billing entity 56, and EPCS entity 58 is shown in the system 50, it is common to have a plurality of such entities in an actual versatile electronic bill presentment and payment system in accordance with the present invention.

As previously described, an internal message interface 34 defines messages that are used to communicate and query data between distributed database entities. Thus, since the user entity 52, the banking entity 54, the billing entity 56, and the EPCS entity 58 are all distributed database entities, they all communicate through internal message interfaces 34. The communications are performed over interconnections 60, which can be electrical wire, optical fiber, or microwave-based interconnections.

At this point it should be noted that each internal message interface 34, as well as each external message interface 36, partner message interface 38, and customer care message interface 40, can be implemented using any number of existing message-based communication systems such as, for example, a TCP/IP message-based communication system running on the infrastructure of the internet. Alternatively, the internal message interfaces 34, the external message interfaces 36, the partner message interfaces 38, and the customer care message interfaces 40 could be implemented with proprietary messaging software on a private network or intranet. It should also be noted that there are no requirements as to the nature of the messaging protocol, or any middleware used to support the messaging.

The user entity 52 is typically a personal computer (PC) that is directly connected to the system 50, or is connected to the system 50 through a network server. Thus, the database component 32 associated with the user entity 52 can be located on the PC (e.g., a traditional "fat" client), or on the network server (e.g., an HTML browser client). It should be noted that the database component 32 associated with the user entity 52 can also be located in one of the other distributed database entities, which can download data to the user entity 52 (e.g., a Java client). It should also be noted that the database component 32 associated with the user entity 52 can be distributed among all three of the above-listed locations, owing to the distributed nature of each database component 32. Thus, each database component 32 should not be thought of as a single, monolithic database. Rather, each database component 32 is better described as a distributed repository of data categorized by the entity that "owns" the data.

Wherever it is located, the database component 32 associated with the user entity 52 stores data that is related to the type of user interface (UI) that is being presented to a subscriber of the system 50. For example, the database component 32 associated with the user entity 52 can store data that is related to the particular type of presentation technology being used (e.g., a "fat" client, an HTML browser client, or a Java client), a specific application, or a particular version. The database component 32 associated with the user entity 52 can also store data that is related to a particular computing session such as, for example, the existence of a computing session and/or the duration of a computing session. The database component 32 associated with the user entity 52 can further store subscriber authentication data, which is described in detail below.

The main function of the user entity 52 is to build a UI using data obtained from the other distributed database entities, and then present the UI to a subscriber of the system 50. The presentation of the UI to a subscriber is dependent upon the particular type of presentation technology being used (e.g., a "fat" client, an HTML browser client, or a Java client). For example, a UI for a Java client requires that presentation data be downloaded from one of the other distributed database entities.

Other functions of the user entity 52 include storing certain data locally so as to facilitate off-line editing and viewing, maintaining a state in a connectionless environment (e.g., an HTTP environment), and sensing the availability of software updates and managing their subsequent application. All of these functions depend on the nature of the client (e.g., a "fat" client, an HTML browser client, or a Java client). As previously indicated, another function of the user entity 52 includes storing subscriber authentication data (e.g., a security ticket) that is used to gain access to other distributed database entities in the system 50.

The banking entity 54, which is typically an FI such as, for example, a bank, is generally viewed as a primary point of presence for a subscriber to the system 50, typically providing an appearance of aggregation to the subscriber. This view is held primarily due to the trust that consumers typically place in a bank brand, and the fact that bank customers who already bank online are also likely to want to receive bills online. Thus, in the following discussion, the banking entity 54 is assumed to be the aggregator of the system 50. It should be noted, however, that any one of the other entities could also be the aggregator of the system 50 in accordance with the present invention. There are several factors which can be used to determine aggregator status such as, for example, market clout.

The banking entity 54 typically gains access to the system 50 through a network server. Thus, the database component 32 associated with the banking entity 54 can be located in the network server. It should be noted that the database component 32 associated with the banking entity 54 can also be located in a system associated with the banking entity 54 such as, for example, a DDA system. Such a DDA system could be accessed through the external message interface 36 of the banking entity 54, as described in detail below. It should further be noted that the database component 32 associated with the banking entity 54 can also be located in one of the other distributed database entities, or be distributed among many of the above-mentioned locations, owing to the distributed nature of each database component 32.

Wherever it is located, the database component 32 associated with the banking entity 54 stores bank-specific subscriber profile data profile such as, for example, subscriber names and addresses and subscriber account numbers. The database component 32 associated with the banking entity 54 can also store account information such as, for example, static account information (e.g., lease rate, principle), and dynamic account information (e.g., balance). The database component 32 associated with the banking entity 54 can further store profile data specifically associated with the FI such as, for example, graphics, business rules, banking-related transaction histories, and aggregation relationships such as those between the FI and billers.

Since it is likely that the system 50 will be used with existing banking systems such as, for example, an existing DDA system, one of the main functions of the banking entity 54 is the continuation of current banking and bill payment functionality including the maintaining of customer profiles and already existing interfaces. In its role as aggregator, the banking entity 54 also provides data to the user entity 52 to be used for the creation of a navigation portion of a UI. For an HTML browser client, this data would be used to create a navigation frame, but not a content specific frame. It should be noted that the banking entity 54 can also provide data to the user entity 52 to be used for the creation of a UI for traditional banking and bill payment.

Since the banking entity 54 is generally viewed as the primary point of presence for a subscriber to the system 50, the banking entity 54 also functions as the likely, but not exclusive, entry point for subscriber sign-on. Thus, the banking entity 54 typically controls the sign-on and authentication procedures for subscribers through the user entity 52. It should be noted that the banking entity 54 typically works in conjunction with the EPCS entity 58 in controlling the authentication procedure, as described in detail below.

Another function of the banking entity 54 includes tracking bank related events and storing them in an event tracking database, which is typically associated with the EPCS entity 58, as also described in detail below.

The billing entity 56 is typically a biller such as, for example, a utility company. The billing entity 56 typically gains access to the system 50 through a network server. Thus, the database component 32 associated with the billing entity 56 can be located in the network server. It should be noted that the database component 32 associated with the billing entity 56 can also be located in a system associated with the billing entity 56 such as, for example, a legacy billing system. Such a legacy billing system could be accessed through the external message interface 36 of the billing entity 56, as described in detail below. It should further be noted that the database component 32 associated with the billing entity 56 can also be located in one of the other distributed database entities, or be distributed among many of the above-mentioned locations, owing to the distributed nature of each database component 32.

Wherever it is located, the database component 32 associated with the billing entity 56 stores biller-specific subscriber profile data such as, for example, subscriber names and addresses and subscriber account numbers and types (e.g., business vs. residential phone line). The database component 32 associated with the billing entity 56 also stores billing data for use by the user entity 52 in building the UI for the subscriber. The billing data can include bill availability data, detailed billing data, ads and other cross-sale displays and links, and bill payment terms and conditions.

The database component 32 associated with the billing entity 56 can also store biller transaction history such as, for example, bill data manipulation (e.g., viewing, searching, sorting), and cross-sell events. The database component 32 associated with the billing entity 56 can further store biller profile data such as, for example, graphics, business rules, and relationships with aggregators such as banks.

The main function of the billing entity 56 is to provide billing data to the user entity 52 for use in creating the UI for the subscriber. The billing entity 56 also provides bill availability data to an aggregator database, whether it is located in the banking entity 54, the EPCS entity 58, or another entity, to provide notice of bill availability to subscribers. The billing entity 56 can also access legacy billing systems through the external message interface 36 of the billing entity 56, as indicated above.

Another function of the billing entity 56 includes tracking biller-related events and storing them in an event tracking database, which is typically associated with the EPCS entity 58, as described in detail below.

Figure 5:
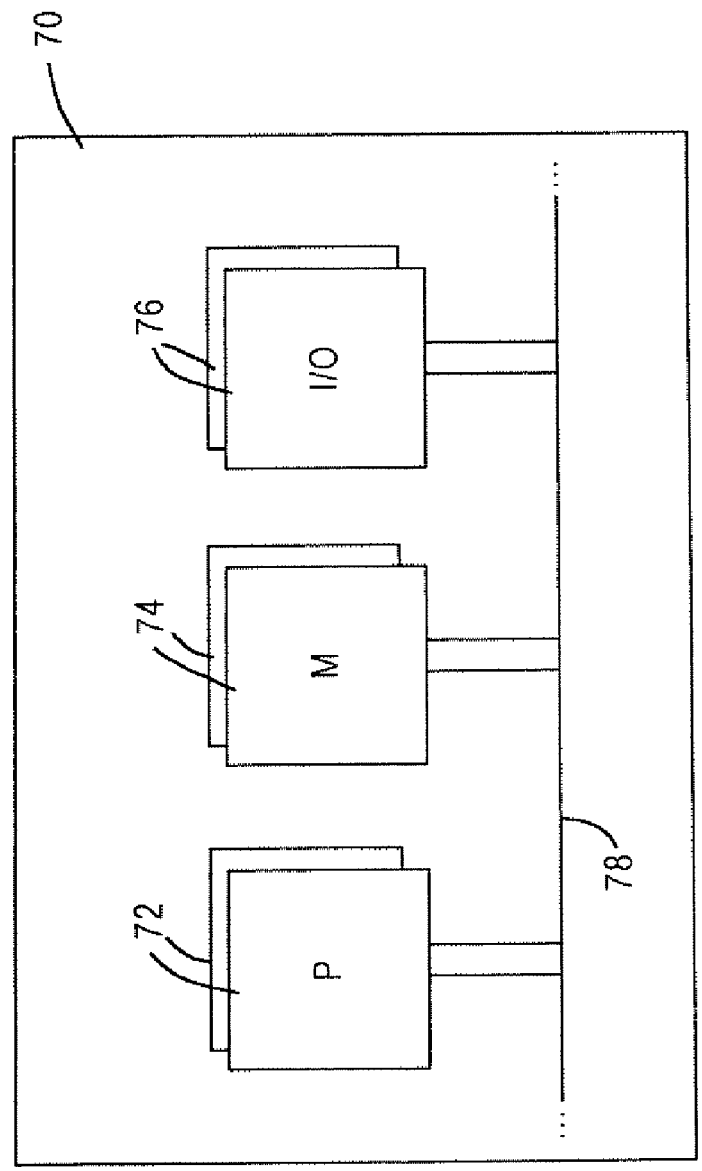
FIG. 5 is a schematic diagram of an electronic payment and customer service (EPCS) entity in accordance with the present invention.

The EPCS entity 58 can generally be described in terms of a data processing system 70, such as shown in FIG. 5. The data processing system 70 preferably comprises at least one processor (P) 72, memory (M) 74, and input/output (I/O) interface 76, which are connected to each other by a bus 78, for implementing the functions of the EPCS entity 58, as described in detail below.

Referring again to FIG. 4, the EPCS entity 58 typically gains access to the system 50 through a network server. Thus, the database component 32 associated with the EPCS entity 58 can be located in the network server. It should be noted that the database component 32 associated with the EPCS entity 58 can also be located in a system associated with the EPCS entity 58 such as, for example, a legacy aggregating system. Such a legacy aggregating system could be accessed through the external message interface 36 of the EPCS entity 58, as described in detail below. It should further be noted that the database component 32 associated with the EPCS entity 58 can also be located in one of the other distributed database entities, or be distributed among many of the above-mentioned locations, owing to the distributed nature of each database component 32.

Wherever it is located, the database component 32 associated with the EPCS entity 58 stores bill payment-specific subscriber profile data such as, for example, subscriber names and addresses, subscriber DDA account numbers, and subscriber credit ratings. The database component 32 associated with the EPCS entity 58 also stores bill payment warehouse data such as, for example, user-specific payees, single occurrence payments, and recurring payments/models.

As previously described, both the banking entity 54 and the billing entity 56 track and store events in an event tracking database. This event tracking database is typically located in the database component 32 associated with the EPCS entity 58. The event tracking data that is stored typically comprises event summaries and links to other databases, perhaps residing at other entities, which provide event details and/or an audit trail.

The database component 32 associated with the EPCS entity 58 also stores bill payment transaction histories, and system subscriber profile data such as, for example, metadata about subscribers and metadata about subscribers' relationships to other entities (e.g., a list of billers that a subscriber has enabled). The database component 32 associated with the EPCS entity 58 further stores billing-related profile information on the system aggregator and billers such as, for example, metadata about billing arrangements (e.g., flat rate, per subscriber, event-driven, etc.), and aggregation data such as, for example, new bill availability and messages or special announcements available from the billing entity 56. The database component 32 associated with the EPCS entity 58 still further stores security data such as, for example, required sign-on information and macro-level authorizations. The database component 32 associated with the EPCS entity 58 additionally stores customer service data such as, for example, FAQ's, FI and biller contact information, and problem resolution data.

The EPCS entity 58 is the glue that holds the distributed database entities together. The EPCS entity 58 accomplishes this by functioning as an integration agent by maintaining bill payment profiles and warehouse data, aggregating bill availability and status data (but typically not bill content or presentation), and maintaining an event tracking database (or audit trail) that can be accessed by all of the database entities. Also, in order to facilitate a single point of sign-on, the EPCS entity 58 functions as the authentication gate keeper. This does not mean to imply that the EPCS entity 58 necessarily maintains user identification numbers and/or passwords. However, it does imply that the EPCS entity 58 accepts sign-on requests and may, if desired, dole out authentication "tickets" in response, in conjunction with the banking entity as described above. Note that the aggregator entity, e.g. the bank entity, may choose to take total responsibility for authentication of the user; in which case, the EPCS entity 58 trusts the aggregator entity to verify the user credentials.

It should be noted that, like user identification numbers and passwords, other data elements, like event details, may end up being virtually aggregated by the EPCS entity 58, but may still physically reside in a distributed manner across several of the database entities.

It should also be noted that the EPCS entity 58 may also route e-mail messages to and from the various database entities, as well as store e-mail messages sent to and from the various database entities.

As previously described, an internal message interface 34 defines messages that are used to communicate and query data between distributed database entities. As also previously described, each internal message interface 34 can be implemented using any number of existing message-based communication systems, or with proprietary messaging software on a private network or intranet. Furthermore, the message specification or file format can be either standard (i.e., open) or proprietary. With this mind, the following types of messages are examples of messages which may be employed to implement an internal message interface 34 in accordance with the present invention.

Depending upon the nature of the presentation technology being used (e.g., a "fat" client, an HTML browser client, or a Java client), the user entity 52 may need to process an internal message to store a security ticket for later use in gaining access to other distributed database entities in the system 50. The user entity 52 may also need to process an internal message to update any resident software. The user entity 52 may further need to process an internal message containing various types of information (assuming a push model). The user entity 52 may additionally need to process internal e-mail messages such as, for example, those for receiving data from other database entities.

The banking entity 54 will process an internal message to add/update/delete/retrieve FI branding information, as well as an internal message to add/update/delete an entry from a list of billers that have been aggregated. The banking entity 54 will also process an internal message to activate a subscriber for home banking via a messaging protocol, which can be an existing messaging protocol such as, for example, OFX or a batch process. The banking entity 54 will further process an internal message to query/update bank subscriber profile data for purposes of customer care. The banking entity 54 will still further process an internal message to query bank transaction history for customer care and for linking to the event tracking database. The banking entity 54 will still further process an internal message to retrieve a list of billers available under the FI sponsor umbrella. An alternative to this is to place the list of billers available under the FI sponsor umbrella in an aggregation database. However, placing the list of billers available under the FI sponsor umbrella allows the EPCS entity 58 to tailor the list by FI sponsor. The banking entity 54 will additionally process internal e-mail messages such as, for example, those for sending data to other database entities, receiving data from other database entities, and broadcasting data to other database entities.

The billing entity 56 will process an internal message to add/update/delete/retrieve biller branding information, as well as an internal message to activate a subscriber for electronic bill presentment via a messaging protocol, which can be an existing messaging protocol such as, for example, OFX or a batch process. The billing entity 56 will also process an internal message to retrieve bill availability data, retrieve bill detail data, and retrieve bill presentation specifications or content. For example, the retrieved data could be URL links to ads and notices, HTML data, or OFX data. The billing entity 56 will further process an internal message to query/update biller subscriber profile data for purposes of customer care. The billing entity 56 will still further process an internal message to query biller transaction history for customer care and for linking to the event tracking database. The billing entity 56 will additionally process internal e-mail messages such as, for example, those for sending data to other database entities, receiving data from other database entities, and broadcasting data to other database entities.

The EPCS entity 58 will process internal event tracking messages. Such event tracking messages are used to gain access to two types of information in the event tracking database: summary data and a link to another database entry that can provide more detail. Such detail includes subscriber enrollment data, subscriber service activation data (e.g., biller, bill payment, banking, etc.), sign-on data, bill availability data, bill viewed data, bill payment generated data (optionally associated with presented bill data), subsequent bill payment events data (e.g., submitted, processed, failed, cleared, remittance received by biller, etc.), cross-sell events data (e.g., ad/offer viewed, ad/offer clicked, product/service purchased), terms & conditions viewed data, email created/read/deleted data.

The EPCS entity 58 will also process an internal messages related to subscriber profile data such as, for example, to add/modify/delete/read subscriber profile data, often as a function of the events listed above (e.g., enrollment, activation, etc.).

The EPCS entity 58 will also process internal security messages. Such internal security messages may relate to authentication, which result in the EPCS entity 58 issuing a security ticket. It should be noted that an authentication request does not have to come as a result of a subscriber "surfing" to the network server of the banking entity 54. It may be initiated if a subscriber tries to gain access to the billing entity 56, and thereby not even contacting the banking entity 54. The point being that with a security ticket a subscriber is generally allowed to freely traverse any database entity in the system 50 without going through repeated sign-on procedures.

An internal security message may also relate to macro-level authorization, wherein a security ticket may contain the credentials to allow a subscriber access to a particular billing entity, but doesn't address micro-level authorization issues such as allowed operations.

An internal security message may also relate to getting a security ticket without authentication. Such a message will originate from a trusted party (e.g., an FI performing its own authentication). Therefore, a security ticket is provided without performing an authentication.

It should be noted that the use of a security ticket enables, but does not mandate, a single sign-on procedure. In other words, a database entity such as, for example, the billing entity 56 may, for whatever reason, require additional authentication information.

The EPCS entity 58 will further process internal messages relating to aggregation data. For example, an EPCS entity 58 will process an internal message to create a link to summary or detailed bill information, or to create a link to message, notice, ad, or some other kind of non-bill information that is available from the billing entity 56.

The EPCS entity 58 will still further process an internal message to query/update bill payment transaction history for purposes of customer care.

The EPCS entity 58 will additionally process internal e-mail messages such as, for example, those associated with routing e-mail, picking-up e-mail, and querying and e-mail mailbox.

The EPCS entity 58 may also process internal messages related to data mining. Such messages are handled very carefully with respect to privacy, perhaps even providing an ACL or other mechanisms to ensure privacy. The results of such messages may be delivered out of band (e.g., by batch).

As previously described, an external message interface 36 defines messages that are used to communicate and query data between a given distributed database entity 30 and any existing system(s) that are directly related to the given distributed database entity 30. As also previously described, each external message interface 36 can be implemented using any number of existing message-based communication systems, or with proprietary messaging software on a private network or intranet. Furthermore, the message specification or file format can be either standard (i.e., open) or proprietary.

Figure 6:
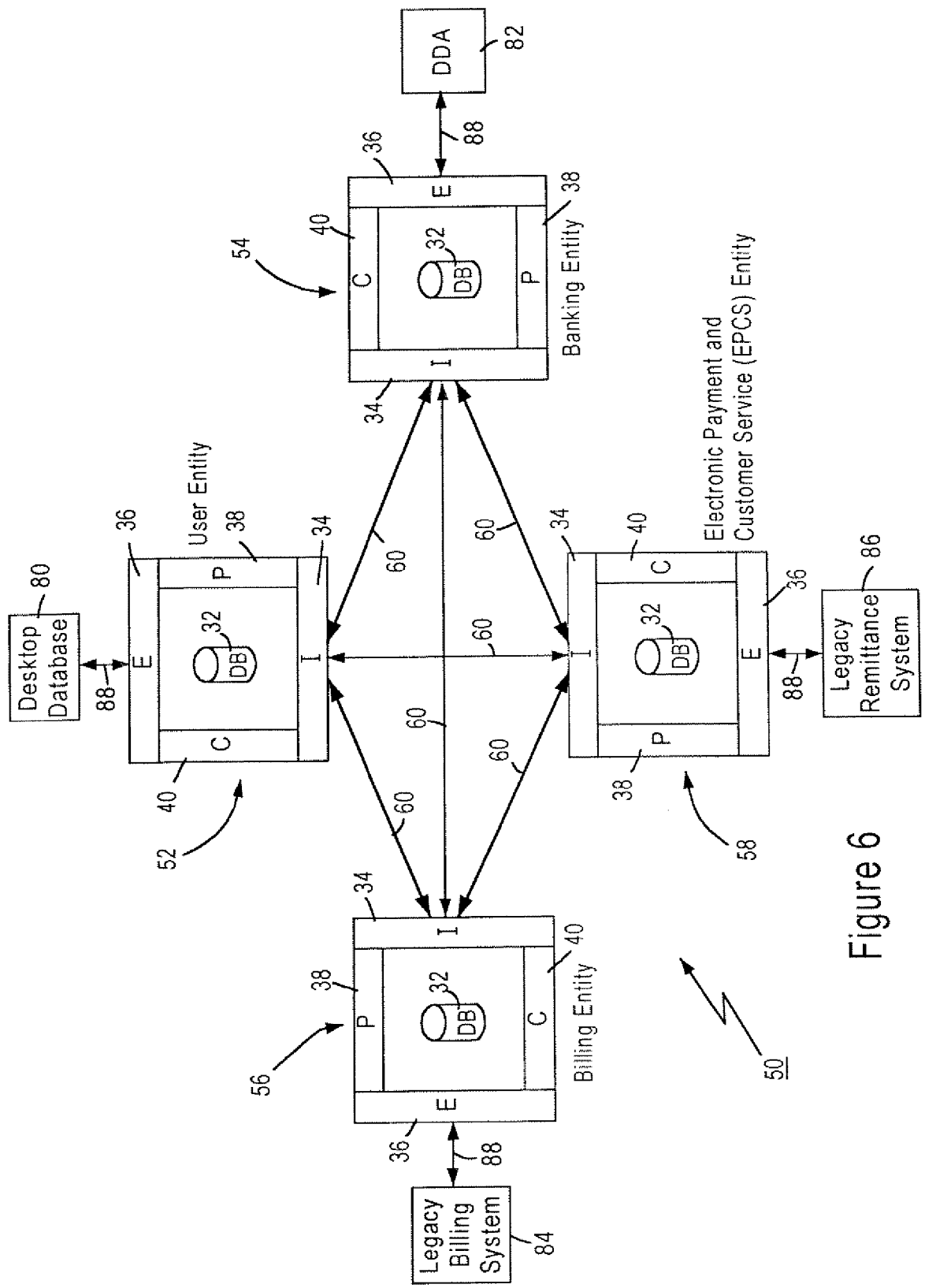
FIG. 6 is a schematic diagram of the electronic bill presentment and payment system shown in FIG. 4, extended to include certain associated directly related systems.

Referring to FIG. 6, there is shown a schematic diagram of the versatile electronic bill presentment and payment system 50, along with some associated directly related systems. The associated directly related systems comprise a desktop database 80, a DDA system 82, a legacy billing system 84, and a legacy remittance system 86. The communications between the various database entities and their associated directly related systems are performed over interconnections 88, which can be electrical wire, optical fiber, or microwave-based interconnections.

Depending upon the nature of the presentation technology being used (e.g., a "fat" client, an HTML browser client, or a Java client), the user entity 52 may need to process an external message in order to communicate with an existing system such as, for example, the desktop database 80. To support such a legacy system, it may be necessary to implement the external message interface 36 of the user entity 52 in the context of an existing, and possibly extended, protocol specification, such as Gold, NPC, or OFX.

The banking entity 54 will process external messages to and from an existing system such as, for example, the DDA system 82 in order to query and update information such as, for example, subscriber profile data, subscriber account data, out-of-band (e.g., ATM) account activity, and statement history. It's also conceivable that the banking entity 54 would need to interface with other banking systems (e.g., stops). Thus, the external message interface 36 of the banking entity 54 is a key feature of the versatile electronic bill presentment and payment system 50.

The billing entity 56 will process external messages to and from an existing system such as, for example, the legacy billing system 84 in order to query and update information such as, for example, subscriber profile data, subscriber account data, account activity, and statement history. Most of this data is industry, if not biller, specific. Thus, the external message interface 36 of the billing entity 56 is a key feature of the versatile electronic bill presentment and payment system 50.

The EPCS entity 58 will process external messages to and from an existing system such as, for example, the legacy remittance system 86. The legacy remittance system 86 could be, for example, ACH, RPP, RPS, or Direct Send.

As previously described, a partner message interface 38 defines messages that are used to communicate and query data between a given distributed database entity 30 and any existing system(s) that are indirectly related to the given distributed database entity 30. As also previously described, each partner message interface 38 can be implemented using any number of existing message-based communication systems, or with proprietary messaging software on a private network or intranet. Furthermore, the message specification or file format can be either standard (i.e., open) or proprietary.

Figure 7:
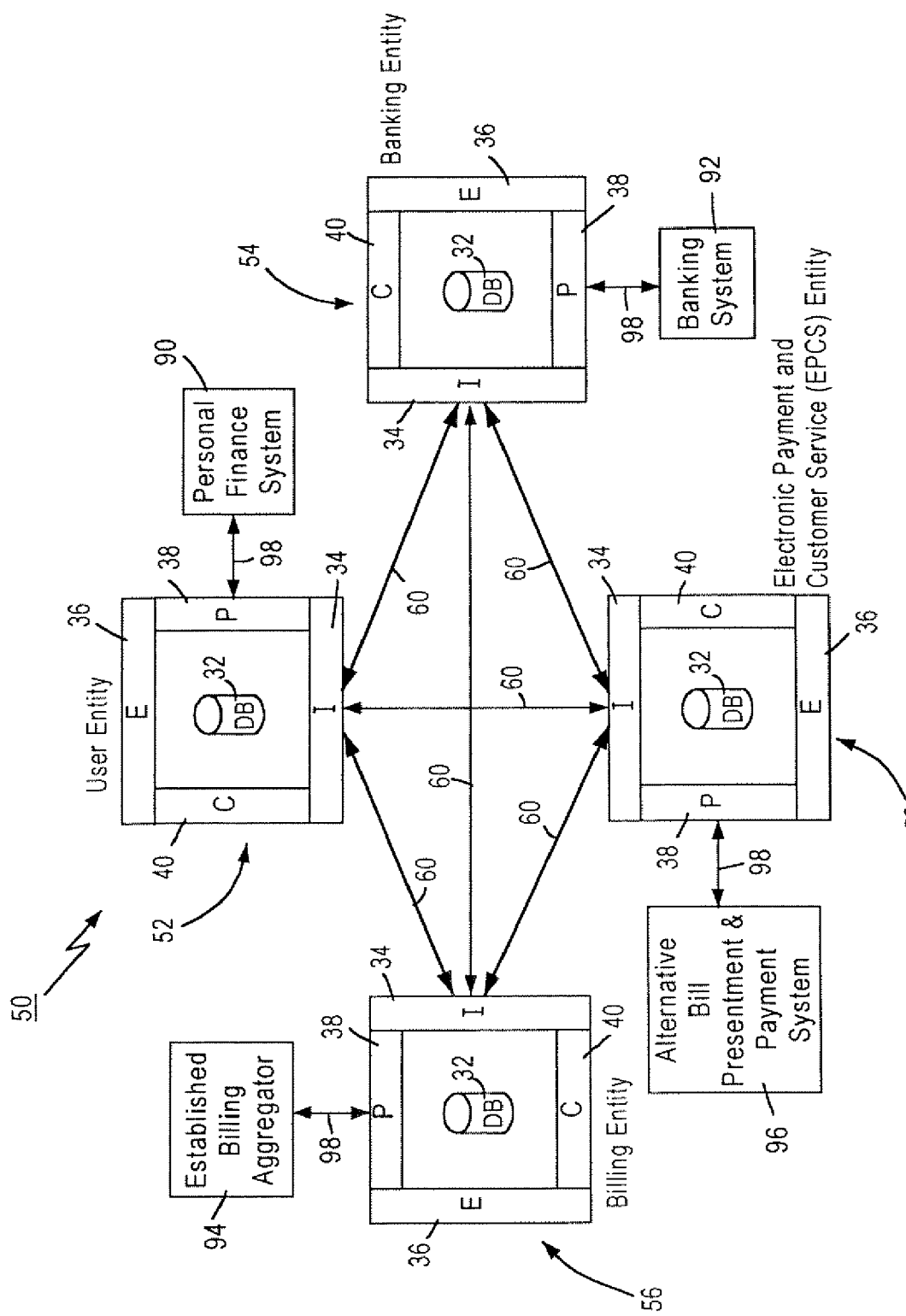
FIG. 7 is a schematic diagram of the electronic bill presentment and payment system shown in FIG. 4, extended to include certain associated indirectly related systems.

Referring to FIG. 7, there is shown a schematic diagram of the versatile electronic bill presentment and payment system 50, along with some associated indirectly related systems. The associated indirectly related systems comprise a personal finance system 90, a banking system 92, an established billing aggregator 94, and an alternative bill presentment and payment system 96. The communications between the various database entities and their associated indirectly related systems are performed over interconnections 98, which can be electrical wire, optical fiber, or microwave-based interconnections.

Depending upon the nature of the presentation technology being used (e.g., a "fat" client, an HTML browser client, or a Java client), the user entity 52 may need to process a partner message in order to communicate with a partner such as, for example, the personal finance system 90. The personal finance system 90 could be, for example, a personal financial manager (PFM) software package such as, for example, Quicken or Money.

The banking entity 54 will process partner messages to and from a partner such as, for example, the banking system 92.

The billing entity 56 will process partner messages to and from a partner such as, for example, the established billing aggregator 94. Such a partner relationship may be required if a large group of subscribers are using the established billing aggregator 94, and thereby have the leverage to demand that all of their bills come through the established billing aggregator 94. The established billing aggregator 94 is essentially treated as a proxy for the billers that it represents. Thus, subscribers to the established billing aggregator 94 will have equal footing as subscribers to the present system 50. This means that subscribers to the established billing aggregator 94 will receive the same event tracking, customer service, and payment processing functionality as subscribers to present system 50. Of course, to gain the additional functionality provided by the present system 50, the established billing aggregator 94, or someone acting on their behalf, will need to provide the same programming support that is required of any biller participating in the present system 50.

To present a bill generated by the established billing aggregator 94, the present system 50 would, for example, receive bill availability data and the URL of a web server of the established billing aggregator 94, and the billing entity 56 would then point to the web server of the established billing aggregator 94 to get an HTML presentation of detailed bill data. In this scenario, the partner message interface 38 would be essentially the same as an internal message interface 34, but possibly with added bulk transfer capability.

The EPCS entity 58 will process partner messages to and from a partner such as, for example, the alternative bill presentment and payment system 96. Such a partner relationship may be required if a billing entity 56 has a subscriber base that is split between using the present system 50 and the alternative bill presentment and payment system 96. In such a scenario, the present system 50 could function as a billing aggregator for the alternative bill presentment and payment system 96, and vice-versa. However, the alternative bill presentment and payment system 96 and its subscribers would not receive any of the benefits of the messaging functionality provided by the present system 50. Only the minimum amount of functionality would be provided. That is, the partner message interface 38 would only provide what is required to present bills through the alternative bill presentment and payment system 96, and not offer any of the advantages provided by the present system 50. The goal being to have the billing entity 56 encourage all of its subscribers to access bills through the present system 50.

It should be noted that the EPCS entity 58 will typically require the capabilities of a billing entity 56 in order to present bills to and from the alternative bill presentment and payment system 96.

As previously described, a customer care message interface 40 defines messages that are used to communicate and query data between a given distributed database entity 30 and a customer care entity. As also previously described, each customer care message interface 40 can be implemented using any number of existing message-based communication systems, or with proprietary messaging software on a private network or intranet. Furthermore, the message specification or file format can be either standard (i.e., open) or proprietary.

Figure 8:
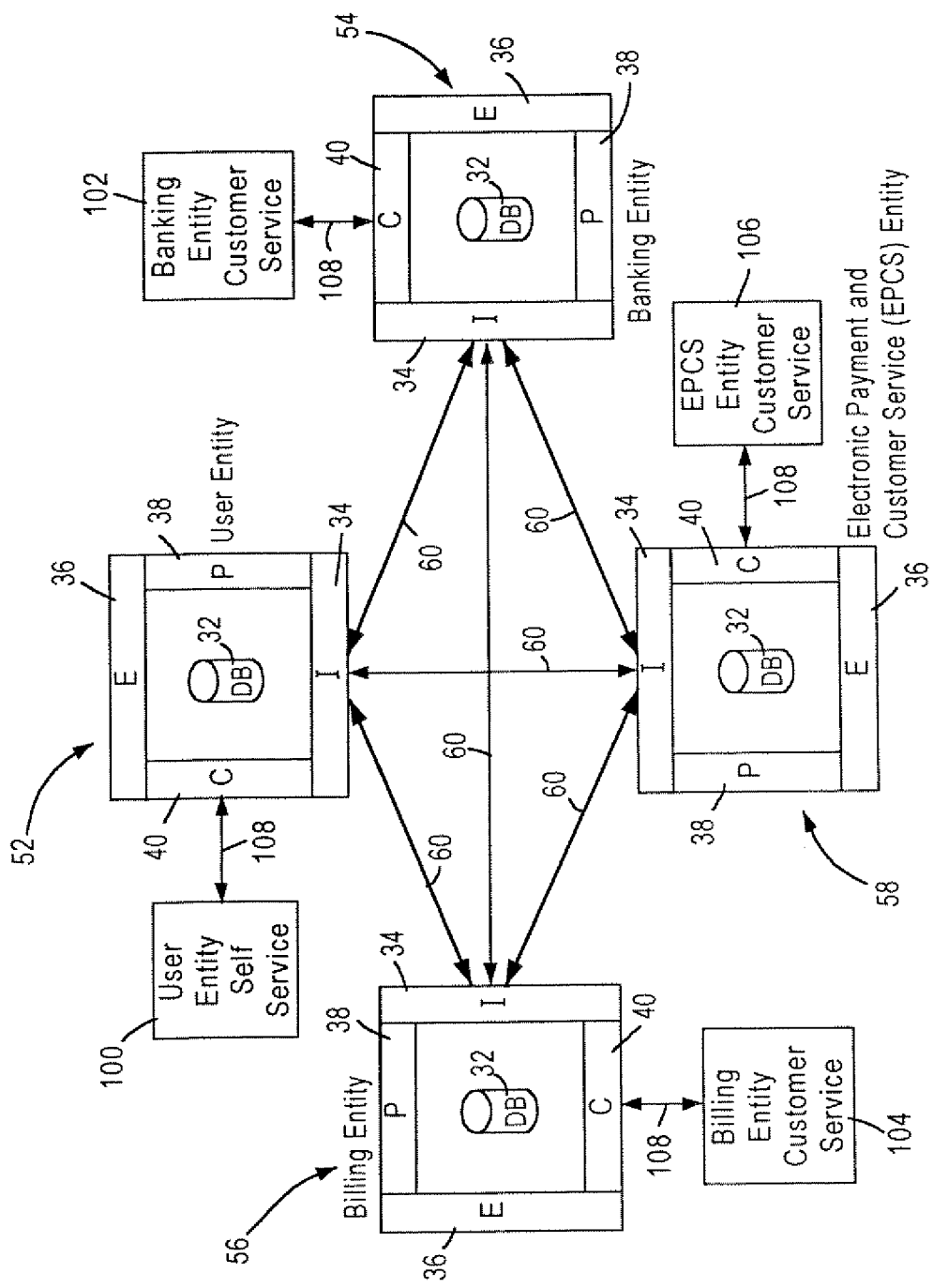
FIG. 8 is a schematic diagram of the electronic bill presentment and payment system shown in FIG. 4, extended to include certain associated customer care entities.

Referring to FIG. 8, there is shown a schematic diagram of the versatile electronic bill presentment and payment system 50, along with some associated customer care entities. The associated customer care entities comprise a user entity self service center 100, a banking entity customer service center 102, a billing entity customer service center 104, and an EPCS customer service center 106. The communications between the various database entities and their associated customer care entities are performed over interconnections 108, which can be electrical wire, optical fiber, or microwave-based interconnections.

Depending upon the nature of the presentation technology being used (e.g., a "fat" client, an HTML browser client, or a Java client), the user entity 52 may need to process a customer care message in order to communicate with a customer care entity such as, for example, the user entity self service center 100. The user entity self service center 100 could be, for example, a self service diagnostic tool.

The banking entity 54 will process customer care messages from a customer care entity such as, for example, the banking entity customer service center 102. A customer care message may be a request for data or a request to modify existing data. The banking entity 54 will process such customer care messages by providing the requested data or providing a confirmation that the existing data has been modified, respectively, to the banking entity customer service center 102. The banking entity customer service center 102 could be, for example, a third party telemarketing group that is allowed access to banking and overall system data in order to provide feedback to system subscribers.

The billing entity 56 will process customer care messages from a customer care entity such as, for example, the billing entity customer service center 104. A customer care message may be a request for data or a request to modify existing data. The billing entity 56 will process such customer care messages by providing the requested data or providing a confirmation that the existing data has been modified, respectively, to the billing entity customer service center 104. The billing entity customer service center 104 could be, for example, a third party telemarketing group that is allowed access to billing and overall system data in order to provide feedback to system subscribers.

The EPCS entity 58 will process customer care messages from a customer care entity such as, for example, the EPCS entity customer service center 106. A customer care message may be a request for data or a request to modify existing data. The EPCS entity 58 will process such customer care messages by providing the requested data or providing a confirmation that the existing data has been modified, respectively, to the EPCS entity customer service center 106. The EPCS entity customer service center 106 could be, for example, a third party telemarketing group that is allowed access to event and overall system data in order to provide feedback to system subscribers.

Figure 9:
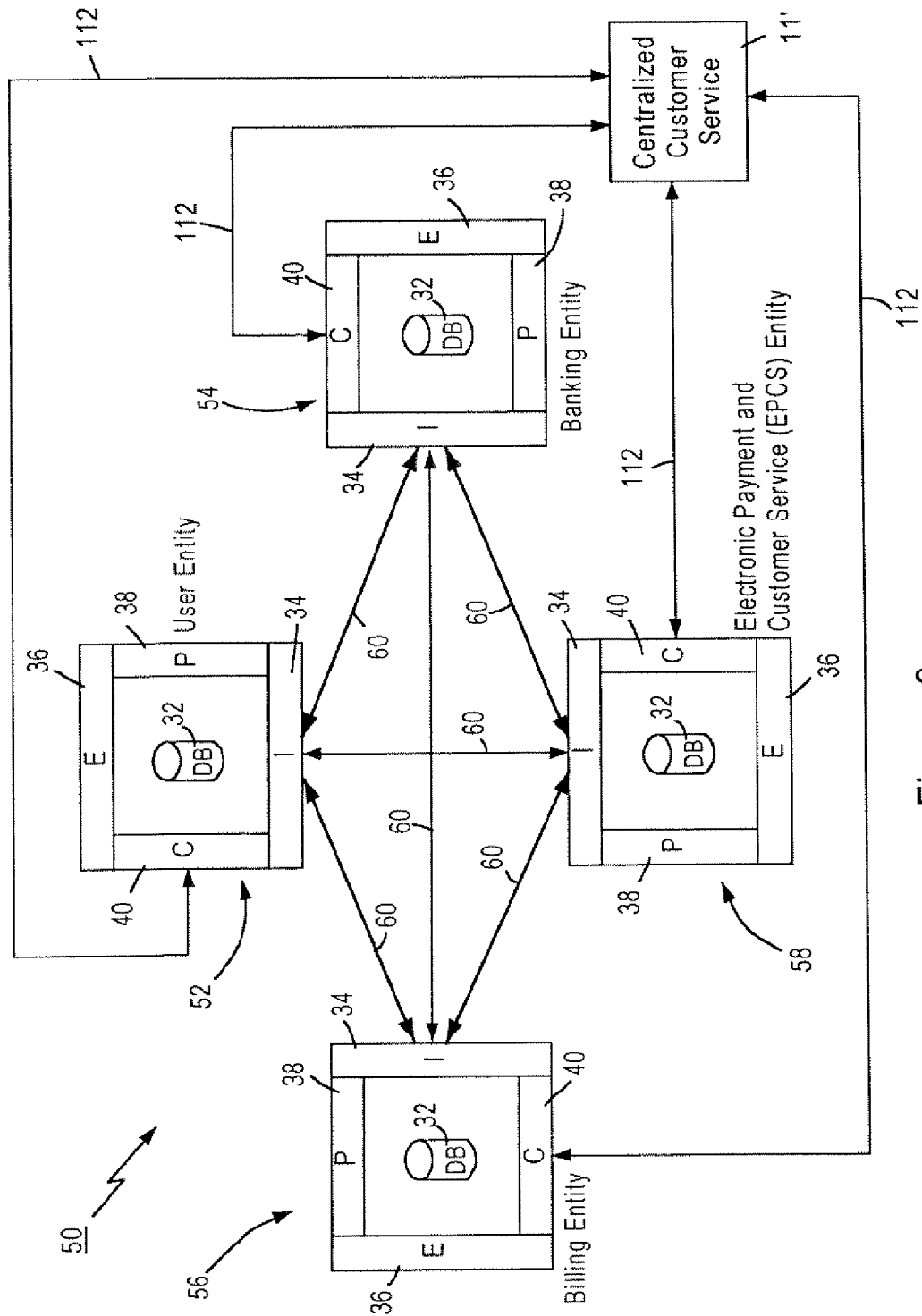
FIG. 9 is a schematic diagram of the electronic bill presentment and payment system shown in FIG. 4, extended to include a centralized customer care entity.

It should be noted that all of the customer care entities described above could be consolidated into a centralized customer service center 110, as shown in FIG. 9. In such a scenario, each of the database entities would process customer care messages to and from the centralized customer service center 110 similar to as described above. The communications between the various database entities and the centralized customer service center 110 would be performed over interconnections 112, which can be electrical wire, optical fiber, or microwave-based interconnections.

Referring to FIGS. 10–15, there are shown flowchart diagrams of data and message flows between the various entities within the system 50. These flowchart diagrams assume that the user entity 52 is an HTML browser client, the banking entity 54 is the primary point of presence for a subscriber to the system 50, the billing entity 56 controls bill presentment, and the EPCS entity 58 controls bill payment.

Figure 10:
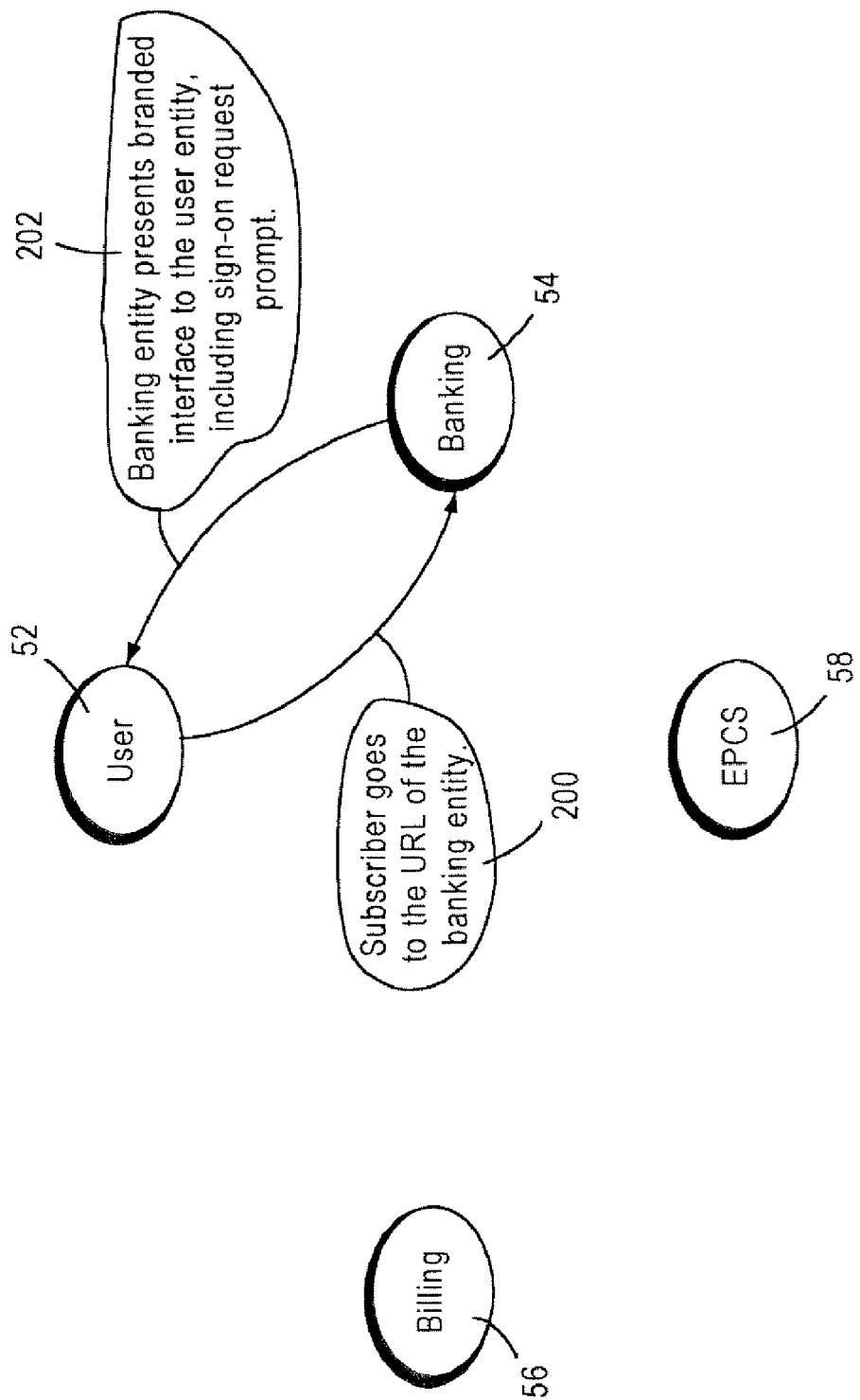
FIG. 10 is a flowchart diagram showing initial sign-on data and message flows between a user entity and a banking entity in the electronic bill presentment and payment system shown in FIG. 4.
Figure 16:
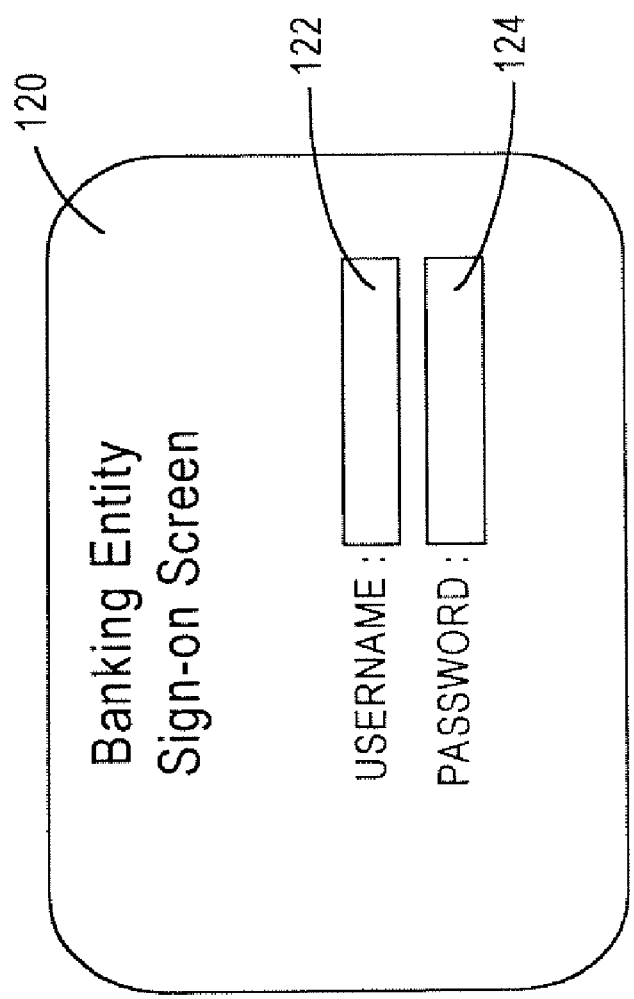
FIG. 16 shows an example of a branded interface having a sign-on request prompt that includes a username field and a password field.

In FIG. 10, a subscriber at the user entity 52 accesses the web site of the banking entity 54 in step 200. In return, the banking entity 54 presents a branded interface to the user entity 52, including a sign-on request prompt in step 202. FIG. 16 shows an example of such a branded interface 120, wherein the sign-on request prompt includes a username field 122 and a password field 124.

Figure 11:
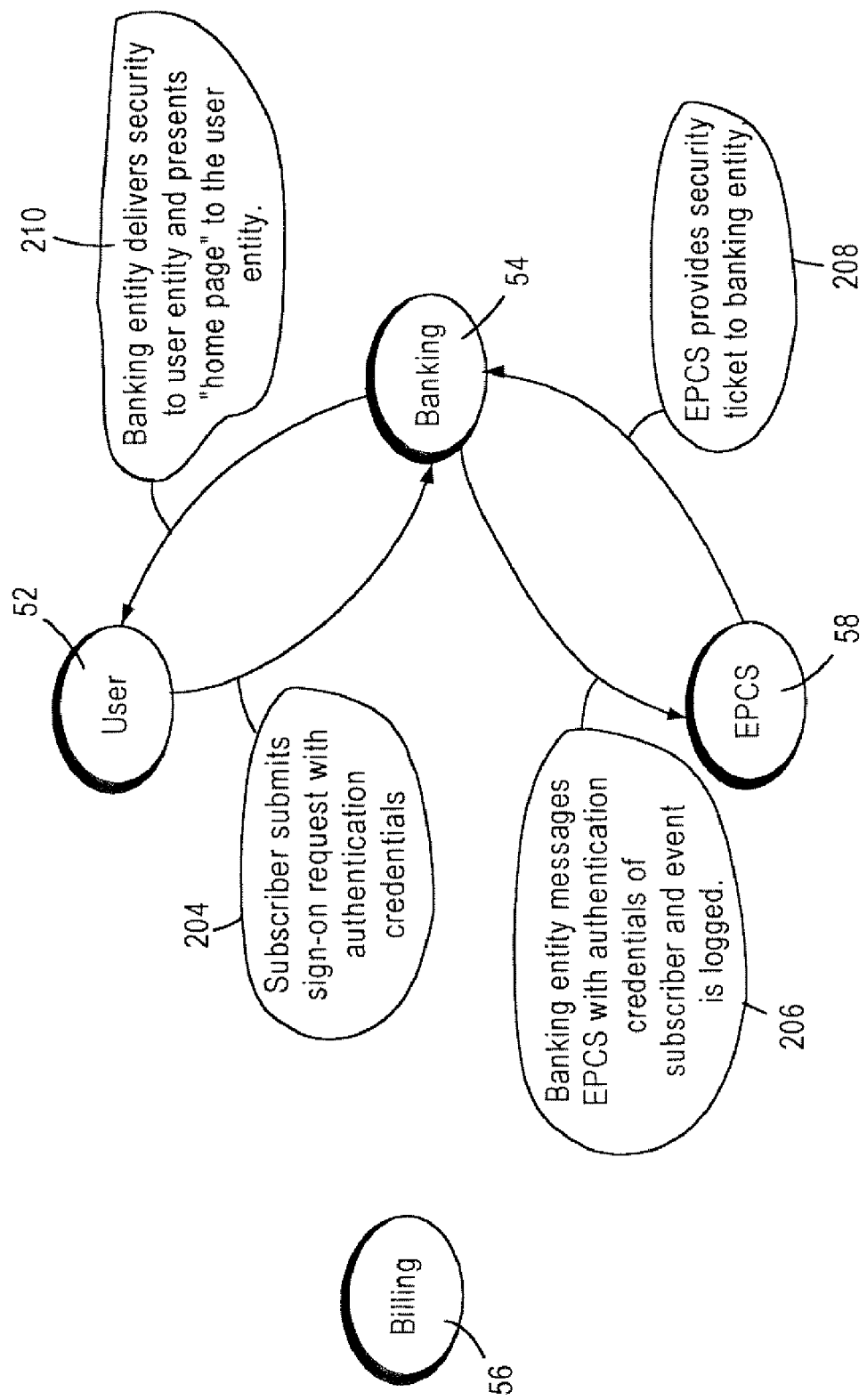
FIG. 11 is a flowchart diagram showing sign-on and authentication data and message flows between a user entity, a banking entity, and an EPCS entity in the electronic bill presentment and payment system shown in FIG. 4.
Figure 17:
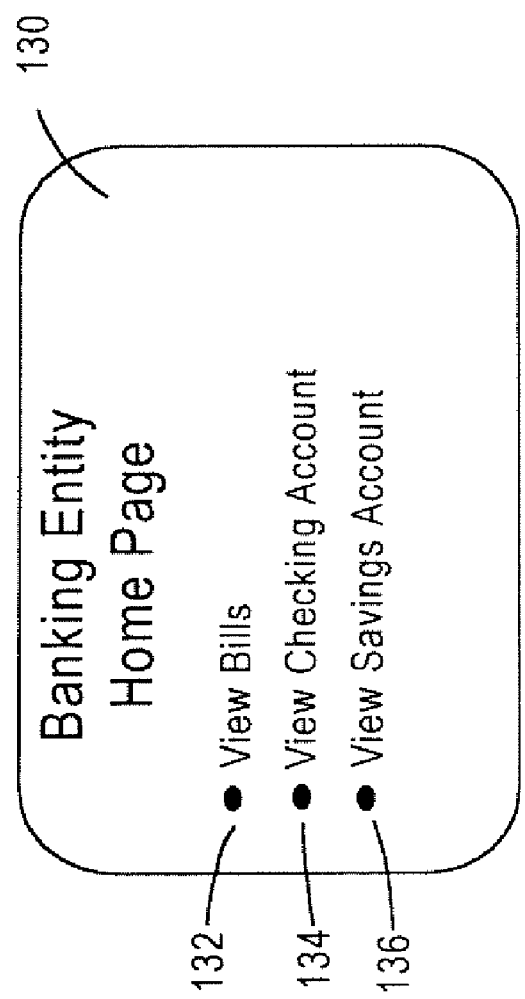
FIG. 17 shows an example of a banking entity home page, including a "view bills" icon, a "view checking account" icon, and a "view savings account" icon.

In FIG. 11, the user entity 52 submits a sign-on request with authentication credentials in steps 204. The banking entity 54 messages the EPCS entity 58 with the authentication credentials of the subscriber and the event is logged in step 206. The EPCS entity 58 provides a security ticket to the banking entity 54 in step 208. The banking entity 54 delivers the security ticket to the user entity 52 and presents its "home page" to user entity 52 in step 210. FIG. 17 shows an example of such a home page 130, which includes a "view bills" icon 132, a "view checking account" icon 134, and a "view savings account" icon 136.

It should be noted that either the EPCS entity 58 or the banking entity 54 could perform the authentication procedure, but in either case the event is still logged in the event tracking database.

Figure 12:
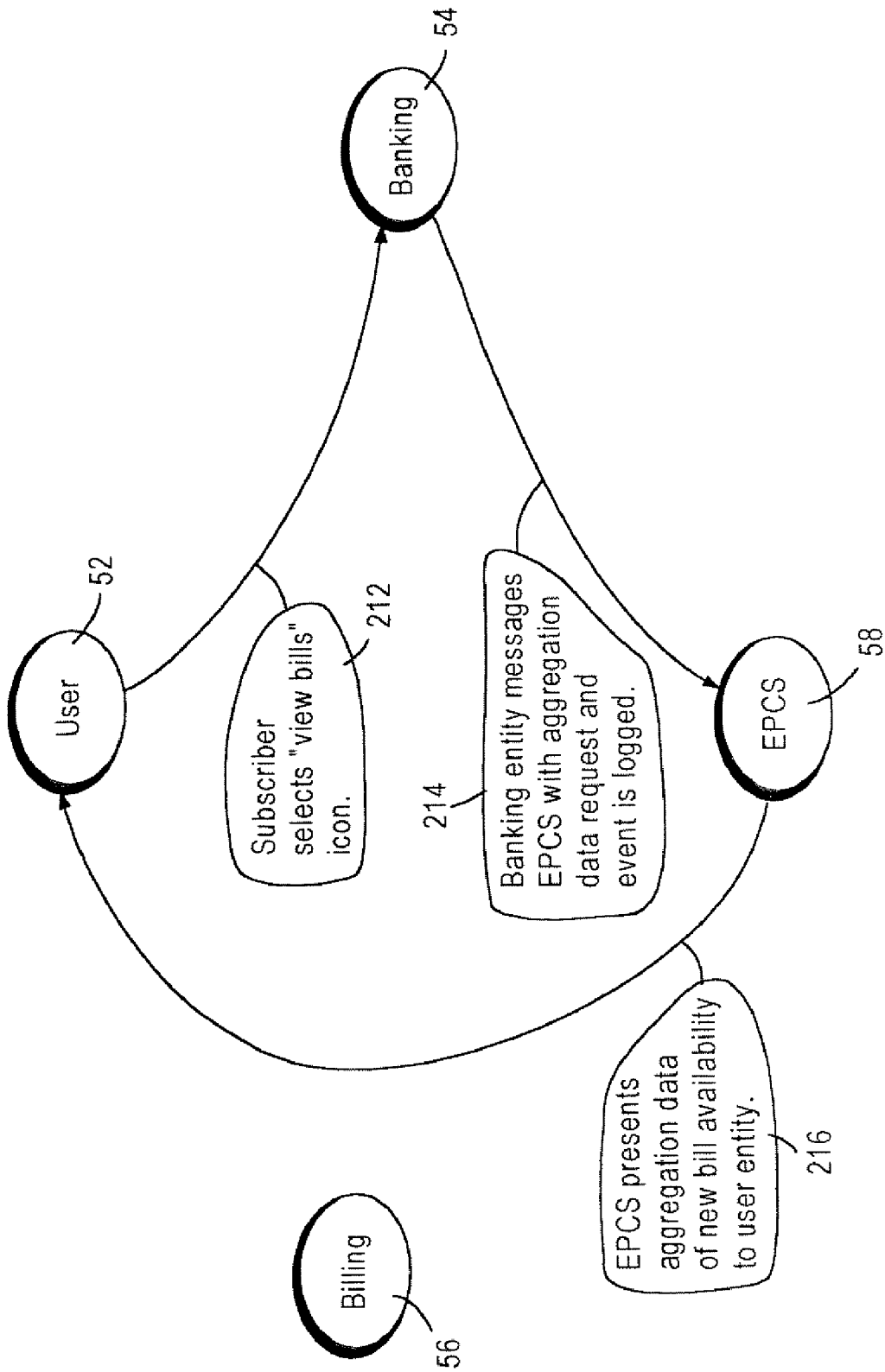
FIG. 12 is a flowchart diagram showing bill availability data and message flows between a user entity, a banking entity, and an EPCS entity in the electronic bill presentment and payment system shown in FIG. 4.
Figure 18:
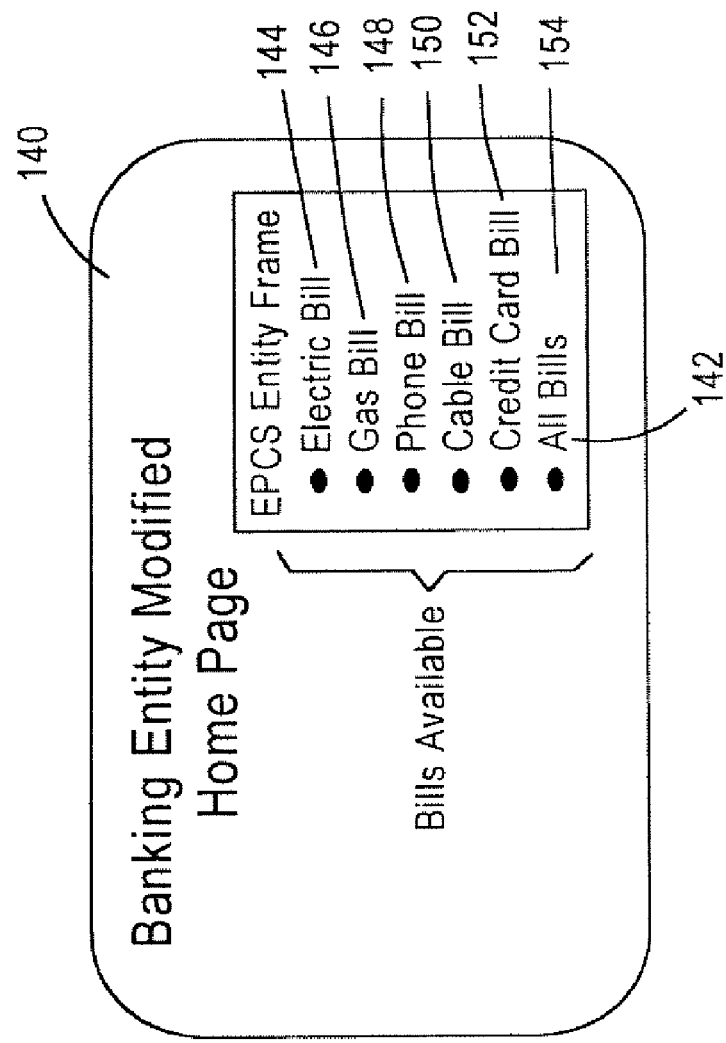
FIG. 18 shows a first modified banking entity home page having a frame presenting new bill availability data.

In FIG. 12, the subscriber selects the "view bills" icon 132 in step 212. The banking entity 54 messages the EPCS entity 58 with an aggregation data request and the event is logged in step 214. The EPCS entity 58 presents aggregation data of new bill availability to user entity 52 in step 216. FIG. 18 shows a first modified home page 140 having an EPCS entity frame 142 presenting the new bill availability data, which includes an "electric bill" icon 144, a "gas bill" icon 146, a "phone bill" icon 148, a "cable bill" icon 150, a "credit card bill" icon 152, and an "all bills" icon 154 which allows all bills to be presented simultaneously, albeit in separate frames.

Figure 13A:
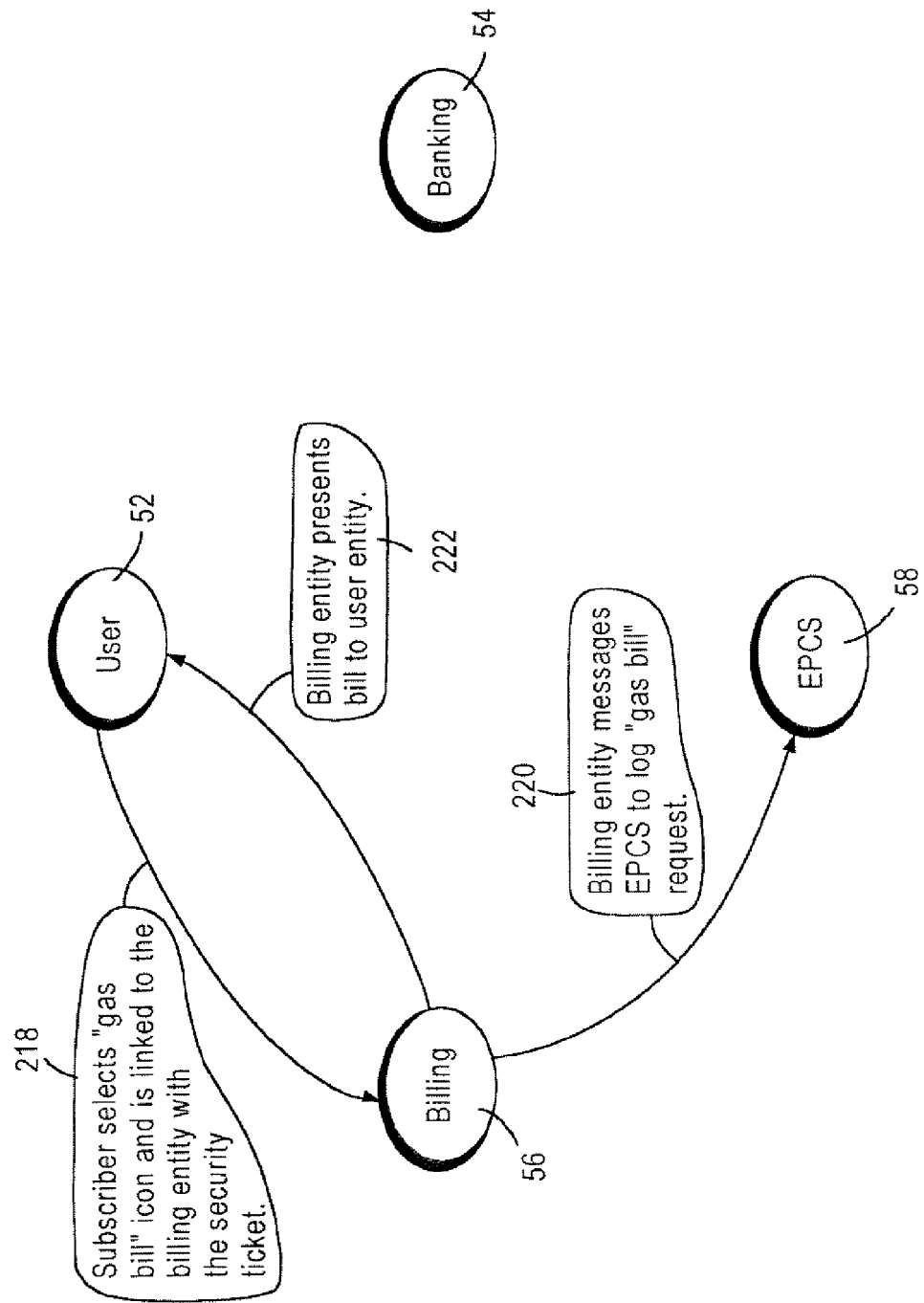
FIG. 13A is a flowchart diagram showing billing entity presentment data and message flows between a user entity, a billing entity, and an EPCS entity in the electronic bill presentment and payment system shown in FIG. 4.
Figure 19:
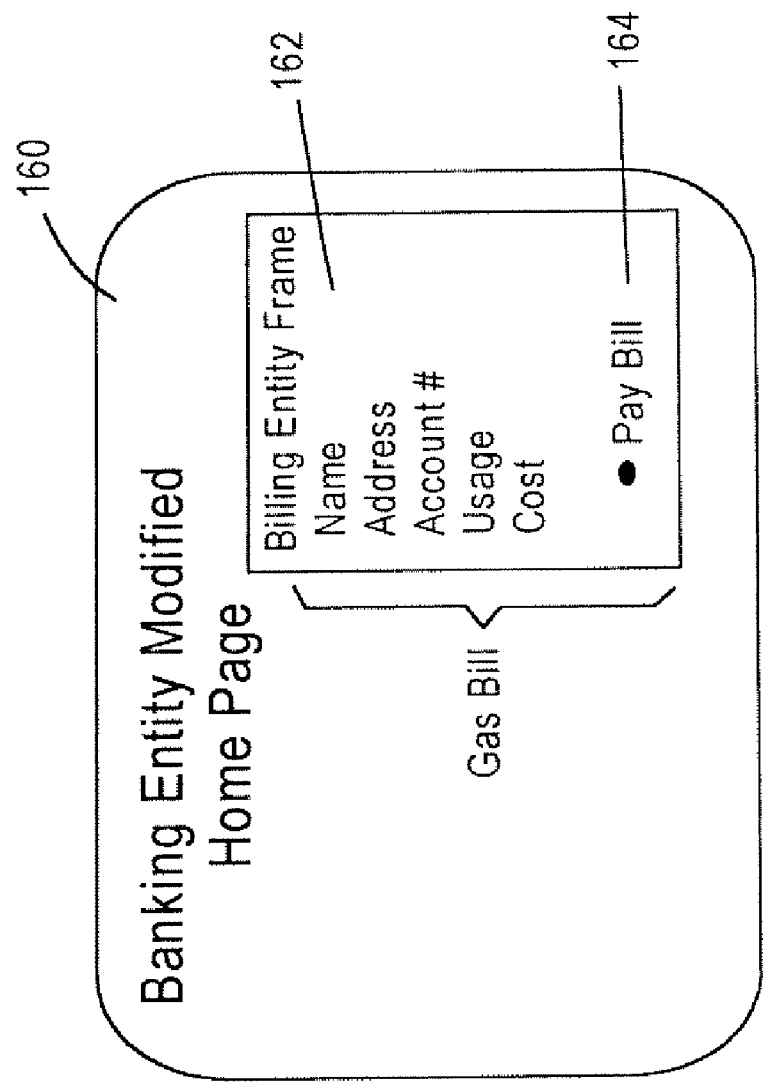
FIG. 19 shows a second modified banking entity home page having a frame presenting detailed bill data.

In FIG. 13A, the subscriber selects the "gas bill" icon 146 and is linked to the billing entity 56 along with the security ticket in step 218. The billing entity 56 messages the EPCS entity 58 to log the "view bill" request event in step 220. The billing entity 56 presents detailed bill data to the user entity 52 in step 222. FIG. 19 shows a second modified home page 160 having a billing entity frame 162 presenting the detailed bill data, which includes the subscriber name, subscriber address, account number, usage, and cost, and a "pay bill" icon 164.

Figure 14:
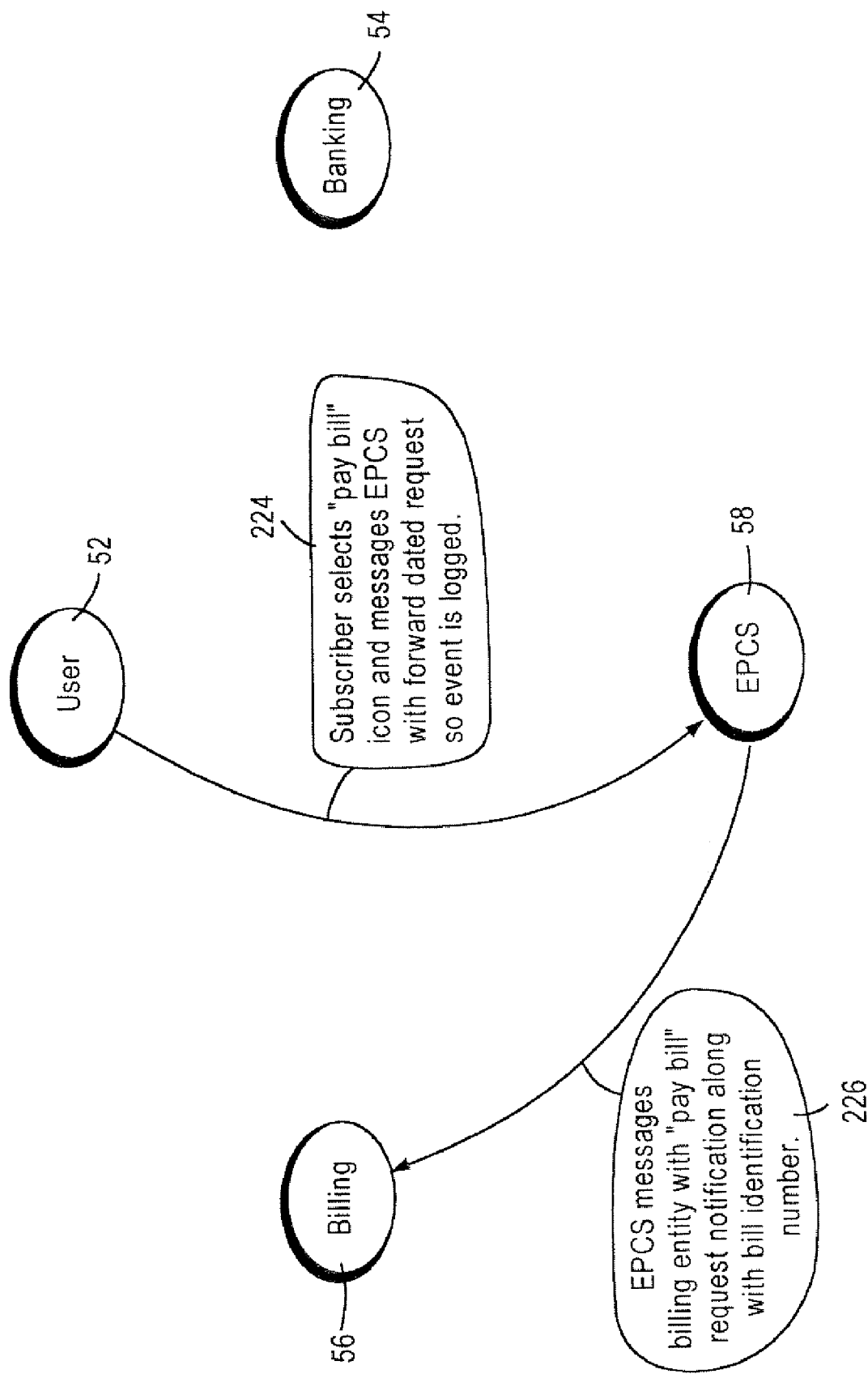
FIG. 14 is a flowchart diagram showing bill payment data and message flows between a user entity, an EPCS entity, and a billing entity in the electronic bill presentment and payment system shown in FIG. 4.

In FIG. 14, the subscriber selects the "pay bill" icon 164 and messages the EPCS entity 58 with a forward dated pay bill request so the event is logged in step 224. The EPCS entity 58 messages the billing entity 56 with a pay bill request notification along with a bill identification number in step 226.

Figure 15:
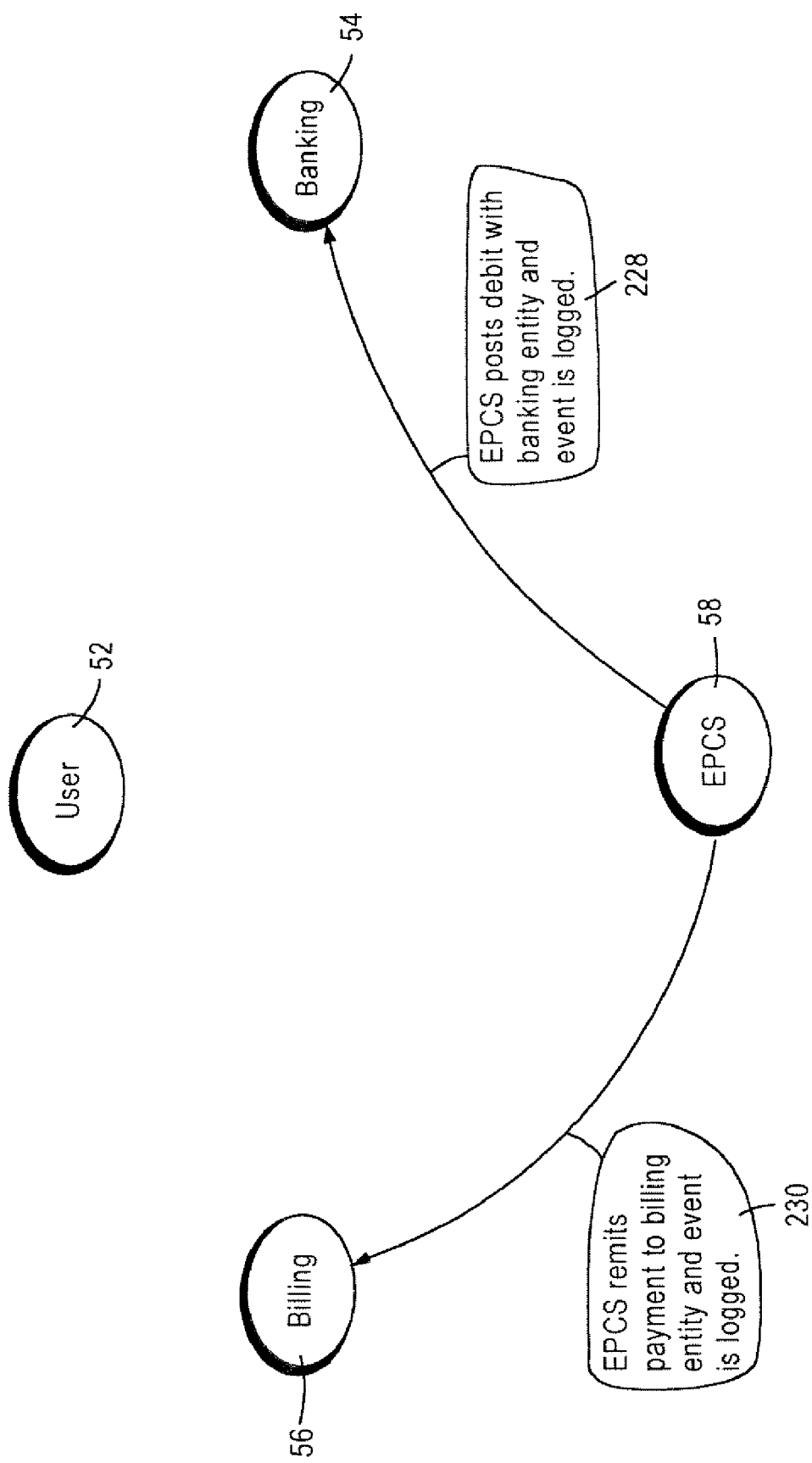
FIG. 15 is a flowchart diagram showing bill remittance and debiting data and message flows between an EPCS entity and a billing entity and a banking entity in the electronic bill presentment and payment system shown in FIG. 4.

In FIG. 15, the EPCS posts a debit with the banking entity 54 and the event is logged in step 228. The EPCS entity 58 then remits a payment to the billing entity 56 and the event is logged in step 230.

Figure 13B:
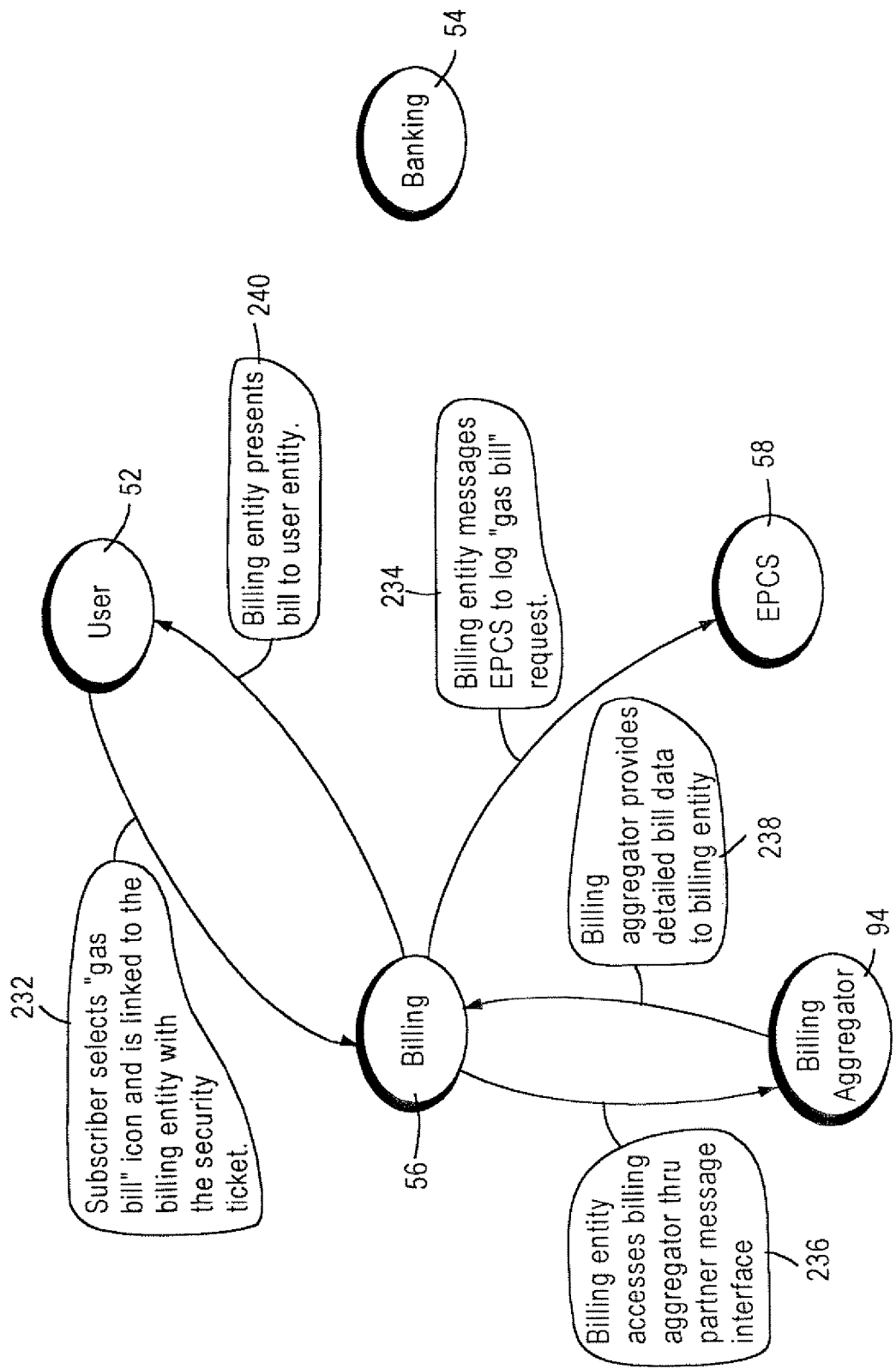
FIG. 13B is a flowchart diagram showing billing aggregator bill presentment data and message flows between a user entity, a billing entity, an EPCS entity, and an established billing aggregator in the electronic bill presentment and payment system shown in FIG. 4.

FIG. 13B can be substituted for FIG. 13A in the above-described sequence of flowchart diagrams to show how detailed bill data can be provided by the established billing aggregator 94 through the partner message interface 38 of the billing entity 56. In FIG. 13B, the subscriber again selects the "gas bill" icon 146 and is linked to the billing entity 56 along with the security ticket in step 232. The billing entity 56 again messages the EPCS entity 58 to log the "view bill" request event in step 234. However, in this case, detailed bill data is available only from the established billing aggregator 94. Thus, the billing entity 56 accesses the established billing aggregator 94 through its partner message interface 38 in step 236. In response, the established billing aggregator 94 provides detailed bill data to the billing entity 56 in step 238. The billing entity 56 then presents the detailed bill data to the user entity 52 in step 240.

It should be noted that, in an alternative embodiment, the established billing aggregator 94 could present the detailed bill data directly to the user entity 52.

Figure 13C:
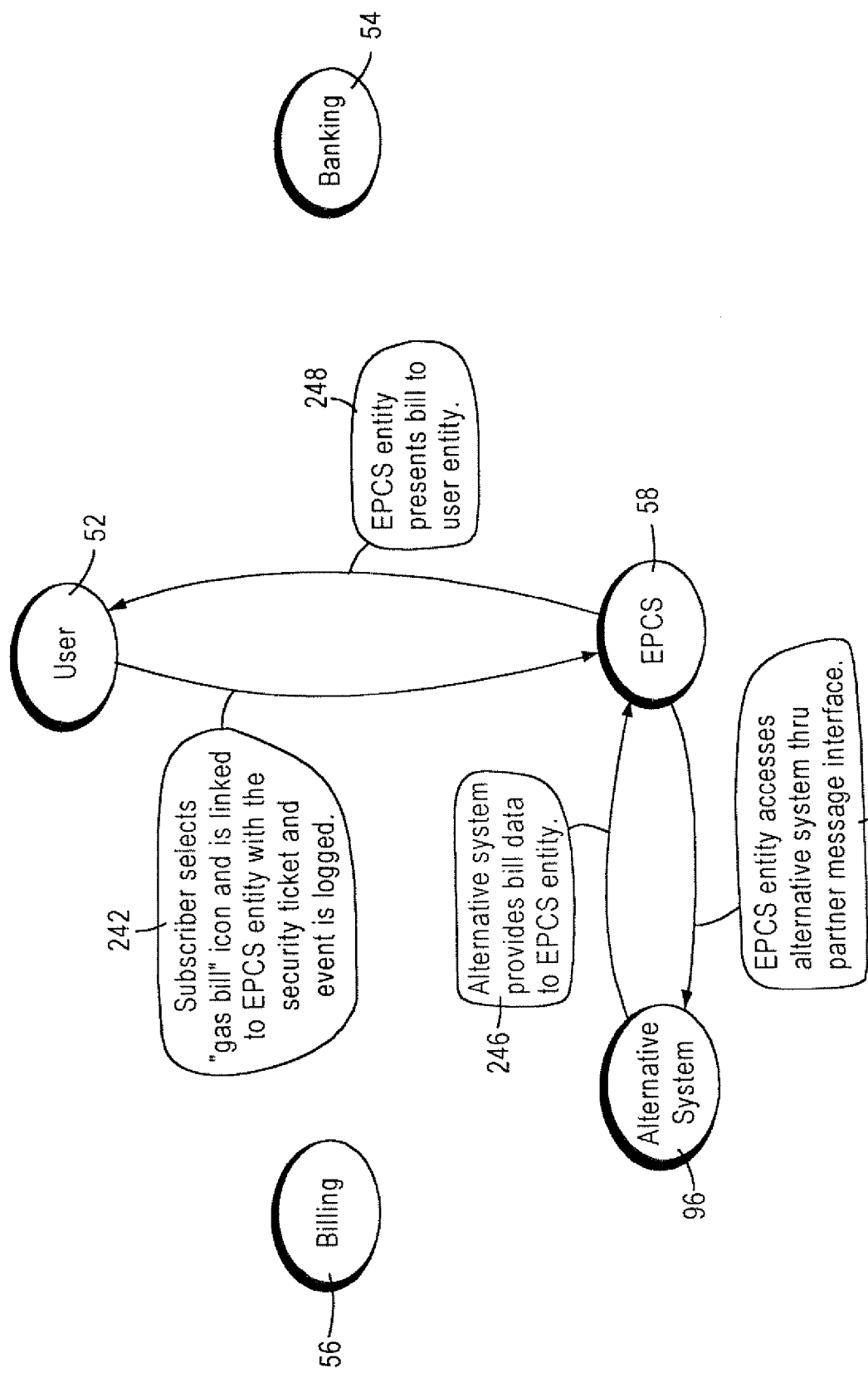
FIG. 13C is a flowchart diagram showing alternative system bill presentment data and message flows between a user entity, an EPCS entity, and an alternative bill presentment and payment system in the electronic bill presentment and payment system shown in FIG. 4.

FIG. 13C can be substituted for FIG. 13A in the above-described sequence of flowchart diagrams to show how detailed bill data can be provided by the alternative bill presentment and payment system 96 through the partner message interface 38 of the EPCS entity 58. In FIG. 13C, the subscriber selects the "gas bill" icon 146 and is linked back to the EPCS entity 58 along with the security ticket and the event is logged in step 242. In this case, detailed bill data is available only from the alternative bill presentment and payment system 96. Thus, the EPCS entity 58 accesses the alternative bill presentment and payment system 96 through its partner message interface 38 in step 244. In response, the alternative bill presentment and payment system 96 provides detailed bill data to the EPCS entity 58 in step 246. The EPCS entity 58 then presents the detailed bill data to the user entity 52 in step 248.

It should be noted that, as previously described, the EPCS entity 58 will typically require the capabilities of a billing entity 56 in order to present bills to and from the alternative bill presentment and payment system 96. Alternatively, it should be noted that detailed bill data can be provided by the alternative bill presentment and payment system 96 through the partner message interface 38 of the billing entity 56 in a manner similar to that as described in FIG. 13B.

Figure 20:
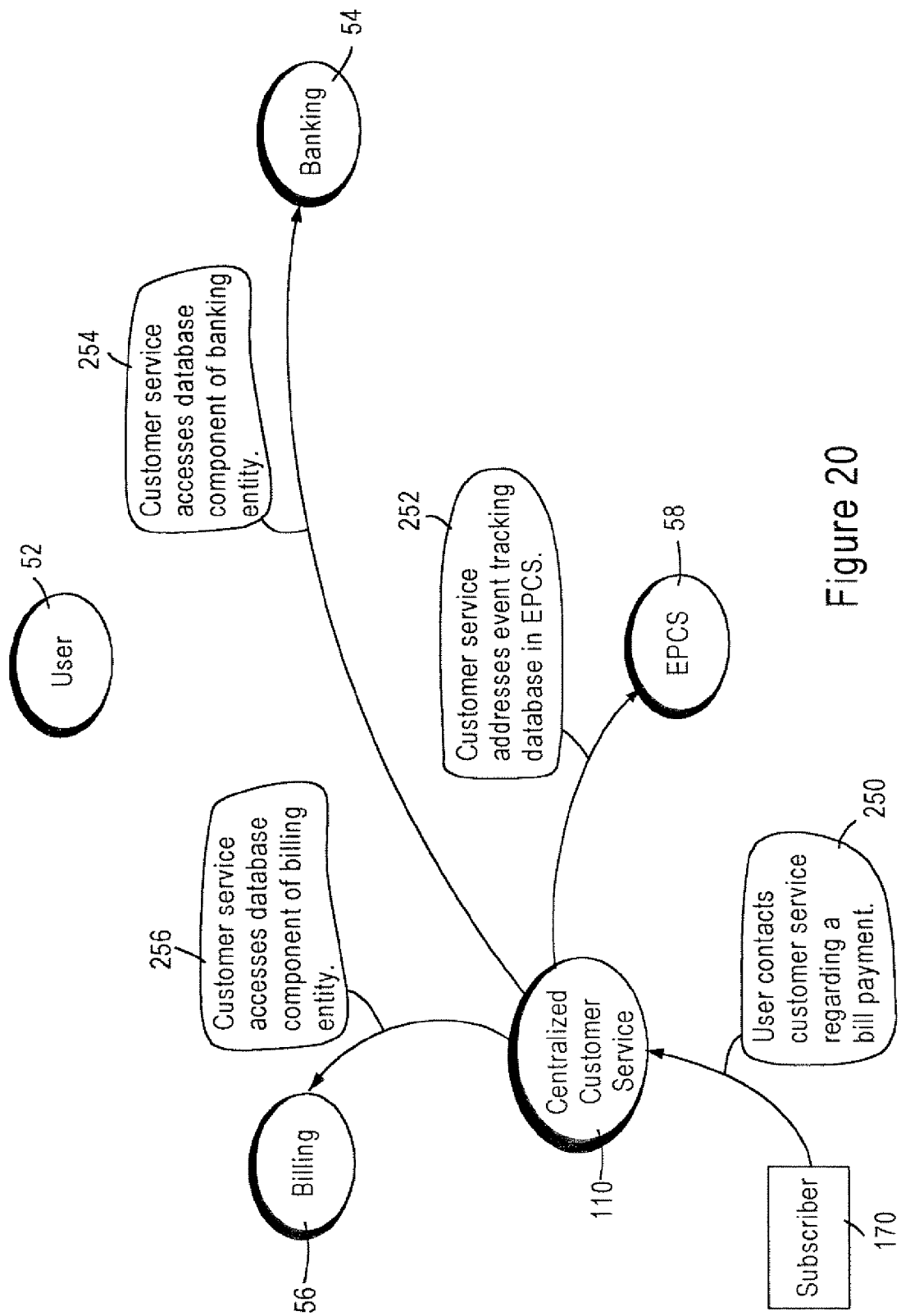
FIG. 20 is a flowchart diagram showing customer service data and message flows between a centralized customer service center, and an EPCS entity, a billing entity, and a banking entity in the electronic bill presentment and payment system shown in FIG. 4.

Referring to FIG. 20, there is shown a flowchart diagram of data and message flows between the centralized customer service center 110 and the various entities within the system 50. A subscriber 170 contacts the centralized customer service center 110 regarding a bill payment in step 250. The centralized customer service center 110 accesses the event tracking database in the EPCS entity 58 to see if a view bill, pay bill, remit payment, or debit posting event has been logged in step 252. If more detailed information regarding, for example, the posting of a debit for a bill, the centralized customer service center 110 can access the database component 32 associated with the banking entity 54, as shown in step 254. Similarly, if more detailed information regarding, for example, the remitting of a payment for a bill, the centralized customer service center 110 can access the database component 32 associated with the billing entity 56, as shown in step 256. It should be noted that, although not shown, the EPCS entity 58 can log all of the above-described accesses performed by centralized customer service center 110.

As is apparent from the foregoing description, the system 50 allows a subscriber to interact directly with individual billers while retaining the benefits of interacting with a single aggregator such as, for example, the ability to retain a single authentication and log-in procedure and a common bill presentation framework. The system 50 also allows a subscriber to retain the benefits of interacting with a single aggregator while allowing the billers and banks to retain certain preferences such as, for example, the ability to retain control of subscriber-related data and a communication channel with each subscriber.

Billers often include promotional information, which could include any type of supplemental information with paper bills. Materials containing such information are sometimes referred to as "envelope stuffers". In a paper world, it is very difficult to selectively provide such supplemental information with only the bills mailed to those customers who are most likely to take advantage of the supplemental information. It is also very difficult to selectively avoid mailing supplemental information with bills to individual customers, e.g. to avoid providing a particular envelop stuffer to some selected group of customers.

For example, a telephone or other company may have certain customers currently using a low level of services. The company's market research may show that these customers are likely to increase their usage based upon a certain type of offer, e.g. a discount plan. The company may also have other customers who are already at a high level of usage. The company's market research may also show that these latter customers are likely to remain at a high level of usage without the discount plan.

In such a case, the company wants to make the promotional offering to the low level users but not to the high level users. Since the market research shows that the high level users will remain high level users without the offer, little, if anything, is to be gained and much could be lost by providing the discount offer to the existing high level users. Accordingly, the present invention allows the high level users to be advantageously serviced through a third party, such as the EPCS, or at a biller network address which is different than a biller network address at which the low level users are serviced. If the servicing is in the nature of bill presentment services, only low level users receive a bill presentation enriched with the special promotional offering. Because only a portion of the customers are serviced from the site offering the enriched bill presentment, greater resources can be focussed on providing a more satisfying bill presentation experience to the lower level users, and hence to the users most likely to increase usage based on the promotion. The system therefore allows resources to be allocated so as to provide the greatest potential benefit to the company.

Figure 21:
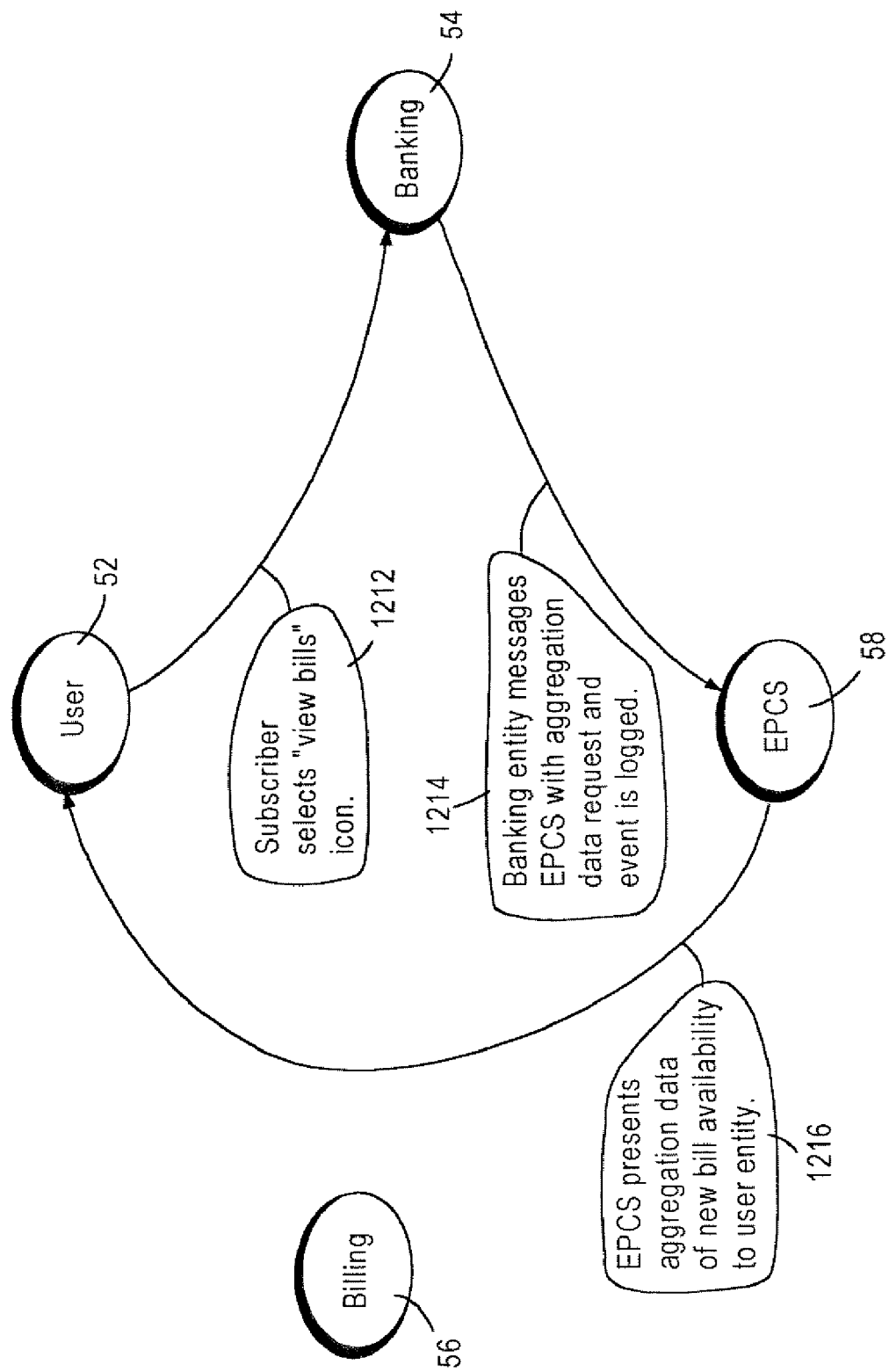
FIG. 21 is a flowchart diagram showing bill availability data and message flows between a user entity, an aggregator entity such as the depicted banking entity, and an EPCS entity in the electronic bill presentment and payment system shown in FIG. 4, modified to allow bills to be selectively presented by at one network site or another network site, in accordance with the present invention.

FIG. 21 depicts the message flow in an alternative electronic billing system implementation which provides greater flexible in the biller control of the servicing of its customers. More particularly, the system allows the biller to select those users who will be directed to a first network address which is preferably, although not necessarily, one controlled by the biller, and those users who will be directed to some other network address, e.g. a different network address controlled by the biller or some other entity, for servicing. For example, different users may be directed to different addresses and/or entities for the presentment of a detailed bill and/or supplemental information such as special offerings. Hence, this alternative system allows billers to choose which users will be directed, for example, to a biller's network address and provided with an enriched presentation experience, and which users will be serviced by the EPCS or some other entity, or at some other biller network address and provided a somewhat different presentment experience.

The database component 32 associated with the billing entity 56 stores a flag or other indicator, sometimes referred to as a "magnet", in the biller-specific subscriber profile data which indicates those users which are to be directed to, for example, the biller for presentment of bills or promotional information that supplements the bill. Users which are not flagged might be presented bills and/or general promotional information by the EPCS, or some other entity, such as a separate bill aggregator or alternative bill presentment and payment system. Alternatively, these non-flagged users could be presented bills and/or general promotional information by the biller, but from a network address different than the address used to present bills and/or special promotional information to the flagged users. The database component 32 associated with the billing entity 56 generally continues to store the billing data for both the flagged and non-flagged users. However, the billing entity also provides the billing data for the non-flagged users to the database of another entity if this other entity will be presenting bills to non-flagged users.

For example, the billing data for non-flagged users could be located at the EPCS entity 58, as has been previously discussed, if the EPCS will be presenting bills to non-flagged users. In such a case, the billing data for the non-flagged users is stored in the database component 32 of the EPCS entity 58. Whether or not the EPCS 58 will be presenting bills to non-flagged users, the database component 32 of the EPCS 58 stores one or more flags or other indicators in the biller-specific subscriber profile data to indicate that certain users are to be presented bills and/or promotional information at other than a primary biller network address. Of course, if desired, the flags could be used to indicate those users which are to be presented bills and/or promotional information at the primary biller address. In either case, the flags or other indicators stored in the EPCS database component 32 are used to ensure that certain users are presented bills and/or promotional information by the EPCS or some other entity, or at an alternate biller address, and other users are presented bills and/or promotional information at the primary biller or other entity address.

Users which are not flagged for the applicable biller in the EPCS database 32 are, in the preferred implementation, directed to the applicable biller primary network address for presentment of bills and/or promotional information. However, as noted above, these users could, if desired, be directed to an address controlled by some other entity. Users which are flagged in the EPCS database 32 are directed to the EPCS 58 or some other entity, or perhaps a different biller network address than the address to which the non-flagged users are directed, for presentment of bills and/or promotional information. In the preferred implementation, users which are not flagged for any billers are always directed to the applicable billers for presentment of bills and/or promotional information. Users which are flagged for some billers and not flagged for other billers are presented bills and/or promotional information of the billers for which they are flagged by the EPCS or at an alternate biller address, and are presented bills and/or promotional information of the billers for which they are not flagged by the billers themselves.

FIG. 22A depicts a database 1170 which is stored in the database component 32 associated with the EPCS 58. The database 1170 includes a user list 1172, listing users A, B, C . . . n, and a biller list 1174, listing billers 1, 2, 3 . . . n. For each user, the database stores bill availability information 1176. The information 1176 may simply indicate that a bill is available or may include bill summary information, such as the total bill amount. For each available bill, a flag or other indicator 1178 is optionally provided. The flag 1178 identifies the bills of those customers which are to be directed to a secondary network address for presentation of requested bills and/or promotional information of a particular biller. The flag information may be provided to the EPCS database at the time the bill availability information is transmitted to the database by the biller. Such transmissions typically occur off-line, e.g. in a non-real-time batch transmission, but could, if desired, occur in an on-line session between the biller and the EPCS. Even in this latter case, however, the session between the biller and the EPCS would typically occur asynchronously, i.e. as a separate session, from the session between the consumer and the EPCS. If desired, the flag could be provided in a communication separate from that transmitting the bill availability information. This may be advantageous if the network address to which the customer will be sent for bill presentment and/or presentation of promotional informaion will not change from billing cycle to billing cycle.

As shown in FIG. 22A, user A has bills available from billers 1 and 2. The biller 1 bill availability information is associated with a flag. Hence, as will be discussed further below, should user A request detailed bill information relating to the biller 1 bill or request payment of the bill without first requesting to view the bill, user A will be directed to a network address other than a primary network address of biller 1 for presentment of the bill and/or promotional material. On the other hand, should user A request detailed bill information relating to the biller 2 bill or request payment of the bill without first requesting to view the bill, user A will be directed to the primary network address of the biller 2 for presentment of the bill and/or promotional information.

User B has bills available from billers 1 and 3. The bill availability information for these bills is not associated with a flag. Accordingly, should user B request detailed bill information relating to the bill of biller 1 or biller 3 or request payment of the bill without first requesting to view the bill, user B will be directed to the primary network address of the applicable biller for presentment of the bill.

User C has bills available from billers 2 and 3. The biller 2 bill availability information is associated with a flag. Hence, should user C request detailed bill information relating to the biller 2 bill or attempt to pay the bill without first viewing the bill detail, user C will be directed to a network address other than a primary network address of biller 2 for presentment of the bill and/or promotional information. On the other hand, should user C request detailed bill information relating to the biller 3 bill or attempt to pay the bill without first viewing the bill detail, user C will be directed to the primary network address of biller 3 for presentment of the bill and/or promotional information.

It should be noted that none of the bill availability information associated with bills of biller 3 are shown to be flagged. This reflects a desire by biller 3 to have all its customers sent to its primary bill presentation address to view detailed bill information and/or promotional information.

As shown in FIG. 22B, the EPCS database component 32 also stores a database 1180 of network addresses 1184 and 1186 in association with an identifier 1182 for each of the billers. As depicted, biller 1 has a primary network address at URL 1A. This address could, for example, be the address of a presentment server at the biller's network site. Biller 1 also has a secondary network address at URL 1B. This address could be a network address of a presentment server at a different entity site, e.g. at the EPCS 58, or a different presentment server at the biller's site or a different address to a single presentment server at the biller 1 site.

Biller 2 has a primary network address at URL 2A. This address could, for example, be the address of a presentment server at the biller 2 network site. Biller 2 also has a secondary network address at URL 2B. As with biller 1, this address could be a network address of a presentment server at a different entity site, or a different presentment server at the biller's site or a different address to a single presentment server at the biller 2 site.

Biller 3 has only a single network address at URL 3. This address could be the address of a presentment server at the biller's network site. Since biller 3 does not have a secondary network address, all customers of biller 3 are directed to a single presentment server for presentment of detailed bill information and/or promotional information.

It will be recognized that, if desired, the number of different secondary network addresses for a given biller identified in database 1182 could be increased to 3 or more. In such a case, different flags, each for example representing a different network address, are used in database 1170 to identify which of the multiple secondary addresses a specific customer is to be directed for electronic bill and/or promotional information presentation.

Turning back to FIG. 21, as shown the subscriber selects the "view bills" icon 1132 in step 1212. The banking, or other aggregator, entity 54 messages the EPCS entity 58 with an aggregation data request and the event is logged in step 1214. The EPCS entity 58 presents aggregation data of new bill availability to user entity 52 in step 1216.

Figure 23A:
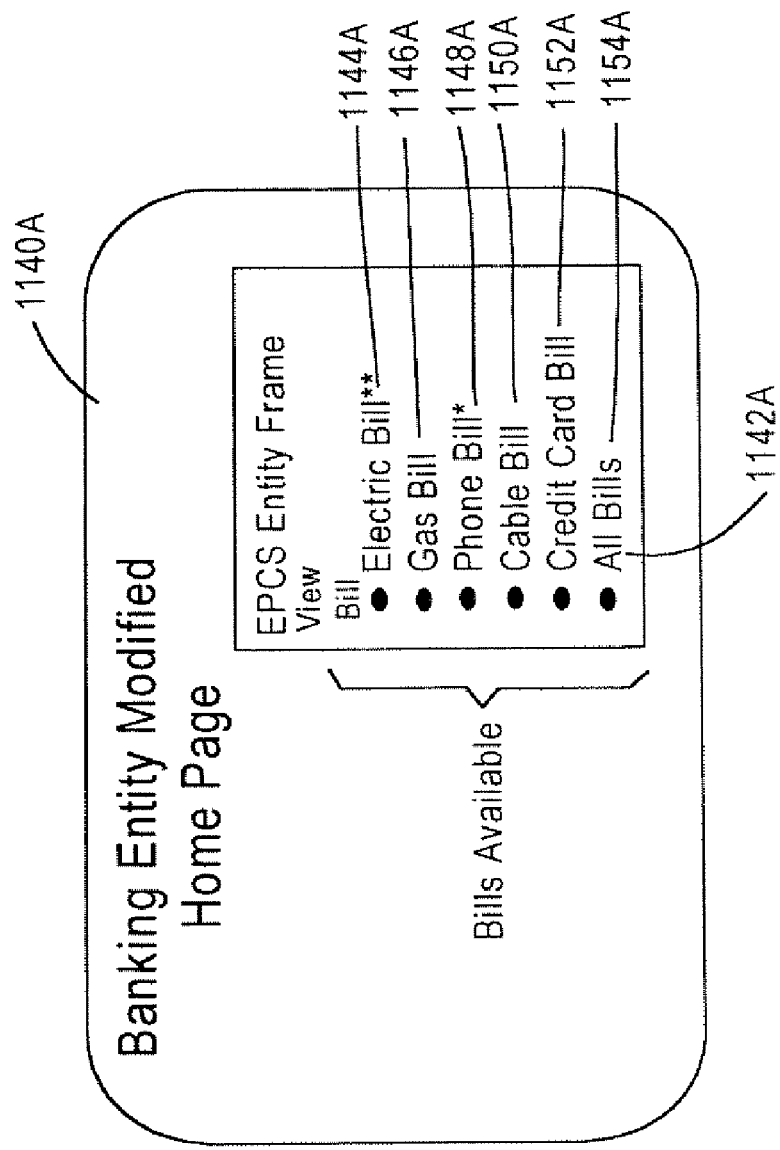
FIG. 23A shows a modified banking entity home page having a frame presenting new bill availability data for a first subscriber, with certain data available at a biller network address and other data available at an EPCS network address or some other network address, in accordance with the present invention.

As shown in FIG. 23A, the banking entity modified home page 1140A includes an EPCS entity frame 1142A presenting the new bill availability data for a first subscriber. FIG. 23A is similar to FIG. 18, except that the user will be hyperlinked to the biller's primary network address to obtain detailed bill data and/or promotional information from some of the billers, but will be hyperlinked to the biller's secondary network address to obtain detailed bill data and/or promotional information of other of the billers.

More particularly, the available bills shown on screen 1140A include an "electric bill" icon 1144A, a "gas bill" icon 1146A, a "phone bill" icon 1148A, a "cable bill" icon 1150A, a "credit card bill" icon 1152A, and an "all bills" icon 1154A which allows all bills to be presented simultaneously, albeit in separate frames. The electric and phone bills are shown with one or more asterisks to indicate that these bills or associated promotional material will be provided to the first subscriber by the EPCS 58 or biller 56 at a secondary biller network address, as will be described in detail below, rather than by the biller 56 at a primary biller address. The asterisk(s) would not actually appear on the screen displayed to the user but is shown here to indicate that the first subscriber has not been flagged by the billers associated with the electric and phone bills so as to aid in the understanding of the invention.

Figure 23B:
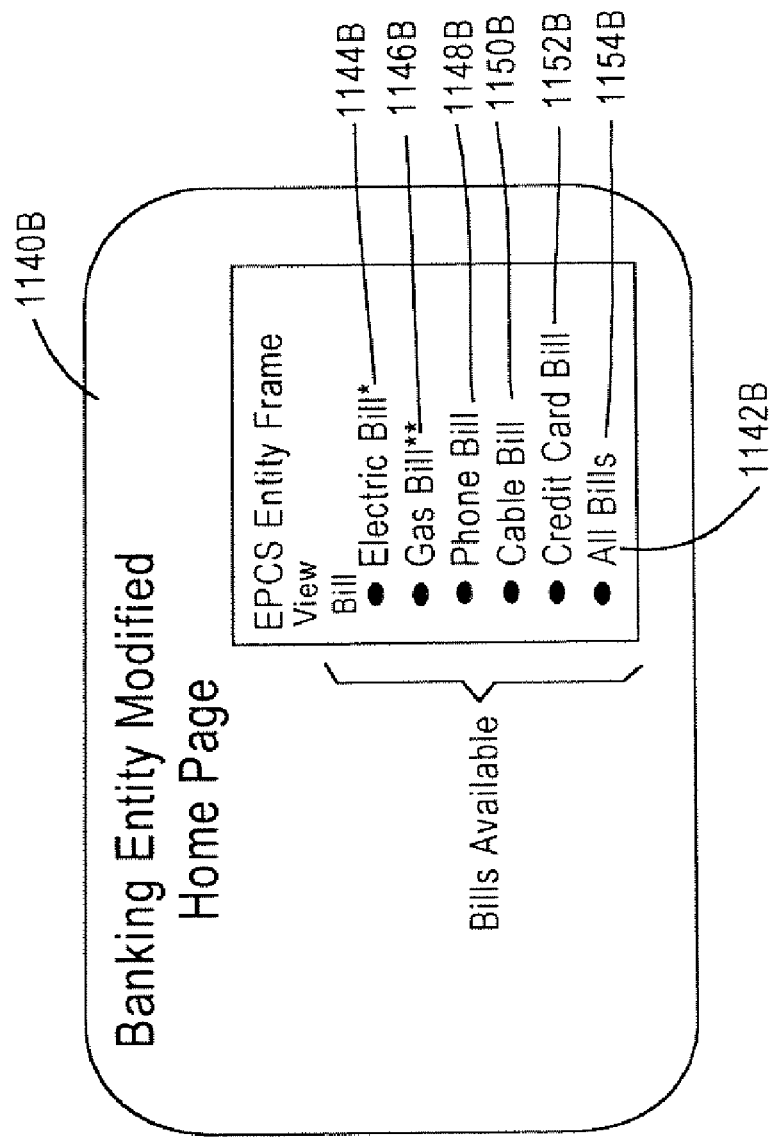
FIG. 23B shows a modified banking entity home page having a frame presenting new bill availability data for a second subscriber, with certain data available at a biller network address and other data available at an EPCS network address or some other network address, in accordance with the present invention.

FIG. 23B is similar to FIG. 23A but is for a second subscriber. The banking entity modified home page 1140B includes an EPCS entity frame 1142B presenting the new bill availability data for the second subscriber. The available bills shown on screen 1140B include an "electric bill" icon 1144B, a "gas bill" icon 1146B, a "phone bill" icon 1148B, a "cable bill" icon 1150B, a "credit card bill" icon 1152B, and an "all bills" icon 1154B. In the case of FIG. 23B, the second subscriber will be hyperlinked to the biller to obtain his/her electric bill and/or promotional information. It should be noted that, although both the first and second subscribers are billed by the same phone company, the first subscriber is directed to the EPCS for presentation of its phone bill and/or promotional information, and the second subscriber is directed to the biller itself for presentment of its phone bill and/or promotional information. The second subscriber will also be hyperlinked to the biller to obtain the gas bill and/or associated promotional information. However, although both the first and second subscribers are billed by the same gas utility company, the biller network address to which the second subscriber will be linked is different than the biller address to which the first subscriber will be linked for presentation of their respective gas bills and/or associated promotional information. Finally, the second subscriber will also be hyperlinked to the EPCS 58 to obtain its electric bill and/or associated promotional information. Hence, in FIG. 23B, the gas and electric bills rather than the electric and phone bills, are shown with an asterisk(s) to indicate that the second subscriber has not been flagged by the electric and gas companies and that these bills and/or associated promotional information will be provided to this particular user at a secondary network address by the biller 56 or the EPCS 58, rather than by the biller 56 at a primary network address.

Figure 23C:
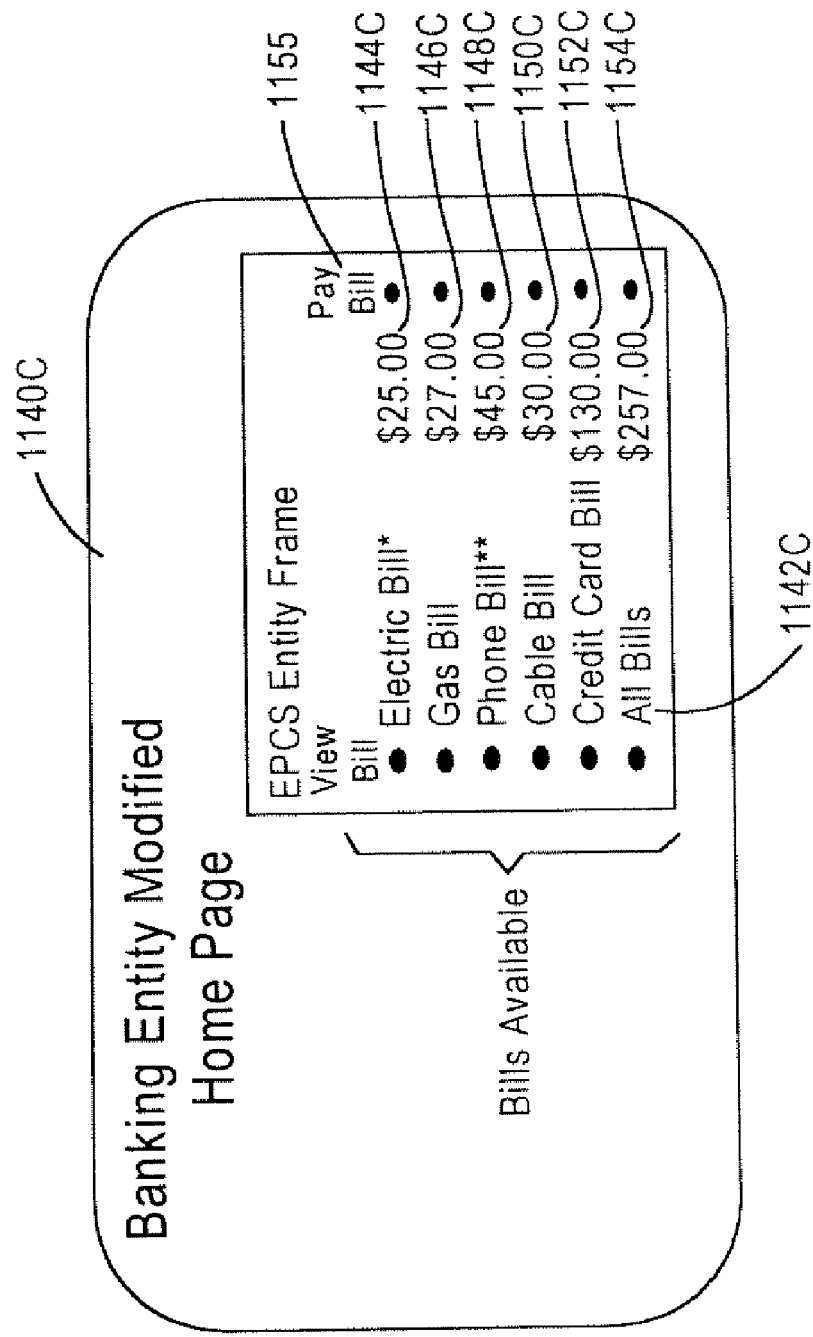
FIG. 23C shows a modified banking entity home page similar to that shown in FIG. 23A, except that the home page has a frame presenting new bill availability data which includes total bill amounts, for the first subscriber, with certain data available at a biller network address and other data available at an EPCS network address or some other network address, in accordance with the present invention.

FIG. 23C is similar to FIG. 23A except that the banking entity modified home page 1140C includes an EPCS entity frame 1142C presenting the new bill availability data, including total bill amounts, for the first subscriber. The modified home page 1140C can be substituted for the modified home page 1140A. The available bills shown on screen 1140C include an "electric bill" icon 1144C, a "gas bill" icon 1146C, a "phone bill" icon 1148C, a "cable bill" icon 1150C, a "credit card bill" icon 1152C, and an "all bills" icon 1154C. A "pay bill" icon 1155 is also provided so that a user can request the payment of the bill amount based upon a review of only the information presented in EPCS frame 1142C. In the case of FIG. 23C, the electric and phone bills are shown with one or more asterisks, as in FIG. 23A, to indicate that the billers associated with these bills have not flagged the first subscriber. Hence, if the "view bill" icon is clicked-on the first subscriber will be hyperlinked as discussed above with reference to FIG. 23A to the appropriate entity and address to view the detailed bill information and/or associated promotional information.

As discussed above with reference to FIGS. 14 and 15, when, after reviewing billing information, detailed or otherwise, the user selects "pay bill", the user is directed to the EPCS 58 which communicates with the applicable billing and banking entities to process the payment. To perform this function, the database component 32 associated with the EPCS 58 entity is made aware of the total amount of each available bill for a user 52. Accordingly, each billing entity 56 must provide bill summary information, including the total bill amount, for each available bill to the aggregator database, which is preferably but not necessarily located at the EPCS entity 58, as has been previously discussed. As shown, the database component 32 of the EPCS entity 58 stores bill summary information for each available bill for each user which is accessed and used by the EPCS to process payments responsive to the receipt of user initiated "pay bill" messages received directly from the user or from the user's sponsor.

In the case of FIG. 23C, the payment process can be initiated by the user directly from the bill availability information presented by the EPCS entity 58 in frame 1142C. However, as noted above, certain billers have flagged the first subscriber, thereby indicating a desire that the first subscriber be directed to those billers. Hence, as will be described further below, the system further provides the ability to direct the user to the biller or any other desired entity even in those cases where the user is offered the option of providing the pay bill instruction from the EPCS bill availability screen, such as in FIG. 23C.

Figure 24A:
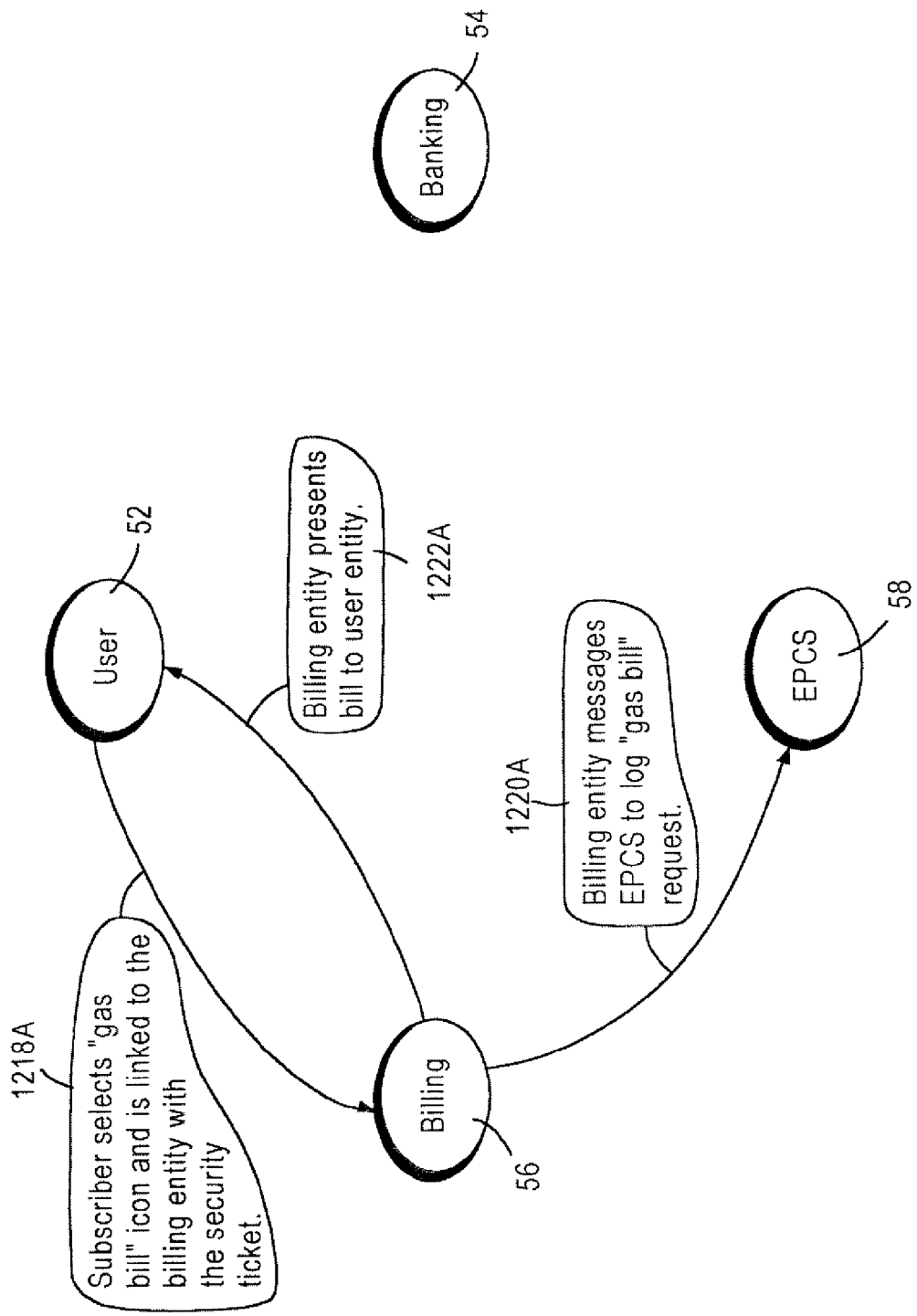
FIG. 24A is a flowchart diagram showing message flows between a user entity, a billing entity, and an EPCS entity in the electronic bill presentment and payment system shown in FIG. 4 for the first subscriber requesting a bill identified in FIG. 23A which is available at the biller address, in accordance with the present invention.

In FIG. 24A, which is similar to FIG. 13A, the first subscriber selects the "gas bill" icon 1146A and is linked to a network address at the billing entity 56, with the security ticket in step 1218A. The billing entity 56 messages the EPCS entity 58 to log the "view bill" request event in step 1220A. The billing entity 56 presents detailed bill data to the user entity 52 in step 1222A.

Figure 24B:
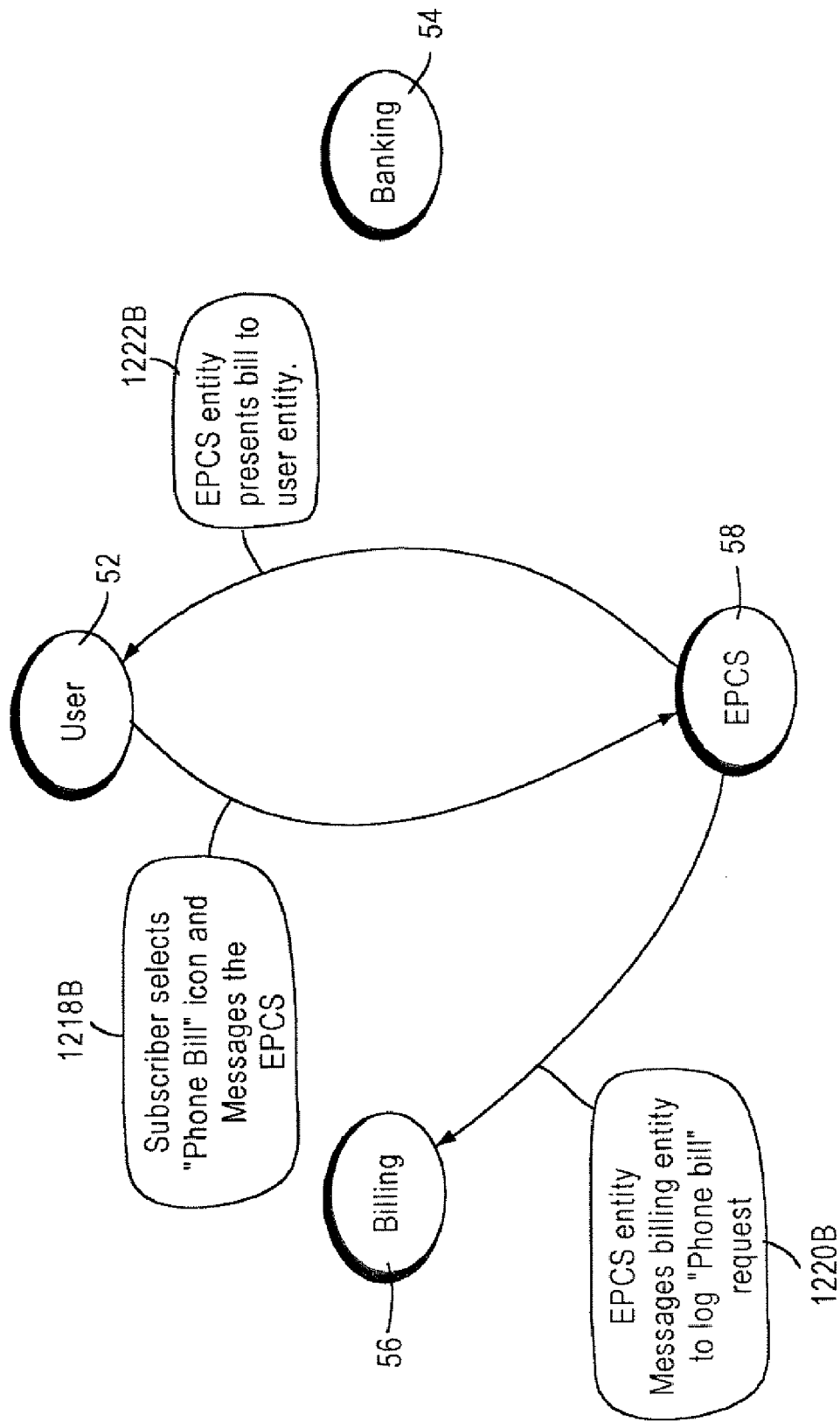
FIG. 24B is a flowchart diagram showing message flows between a user entity, a billing entity, and an EPCS entity in the electronic bill presentment and payment system shown in FIG. 4 for the first subscriber requesting a bill identified in FIG. 23A which is available at the EPCS address, in accordance with the present invention.

In FIG. 24B, which is similar to FIG. 24A, the first subscriber selects the "phone bill" icon 1148B and messages the EPCS 58 for detailed billing data in step 1218B. The EPCS entity 58 messages the billing entity 56 to log the "view bill" request event in step 1220B. The EPCS entity 58 presents detailed bill data to the user entity 52 in step 1222B.

Figure 24C:
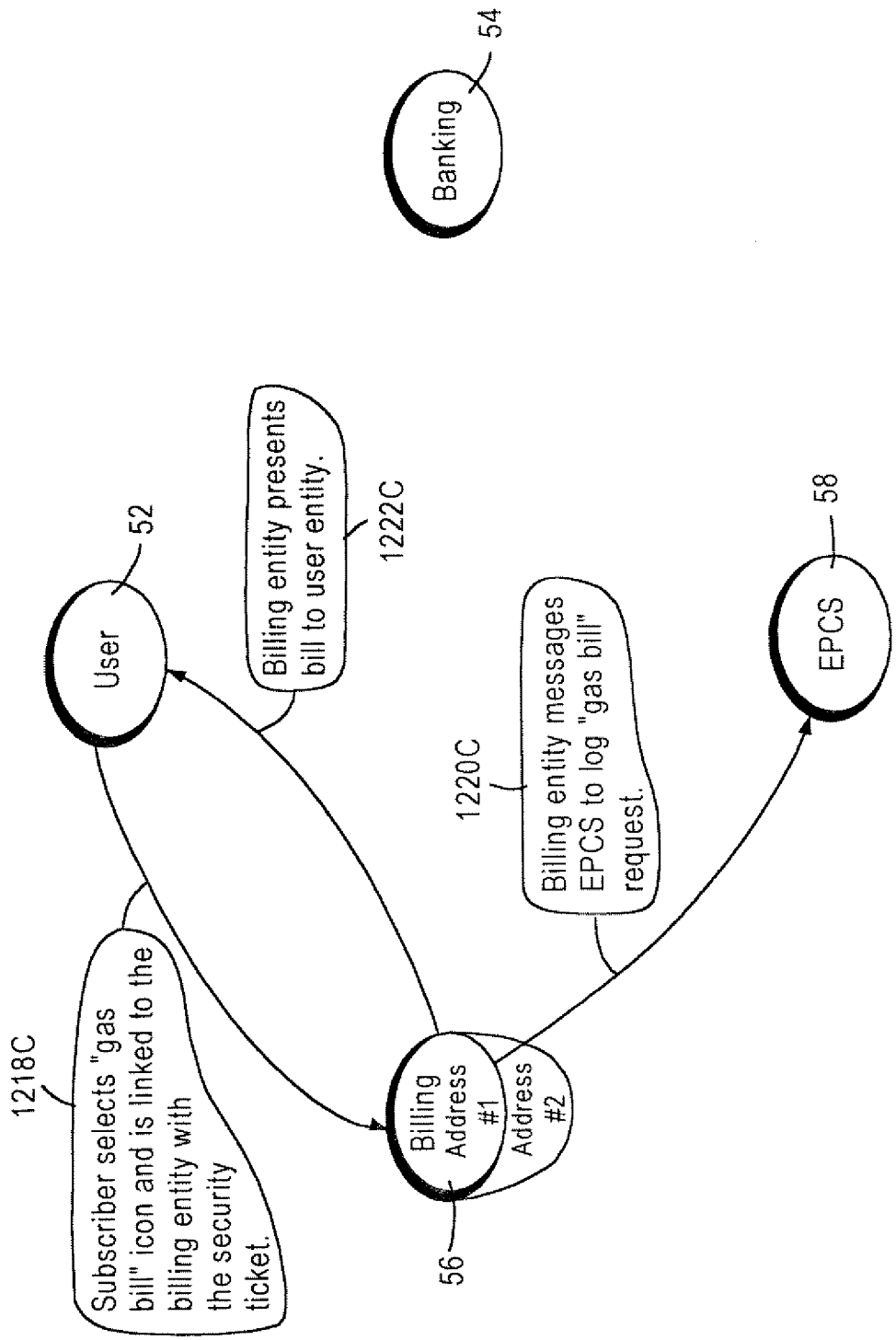
FIG. 24C is a flowchart diagram showing message flows between a user entity, a billing entity, and an EPCS entity in the electronic bill presentment and payment system shown in FIG. 4 for the second subscriber requesting a bill identified in FIG. 23B which is available at an alternate biller address, in accordance with the present invention.

In FIG. 24C, which is similar to FIG. 24A, the second subscriber selects the "gas bill" icon 1146C and is linked to a secondary network address at the billing entity 56, with the security ticket in step 1218C. Although the billing entity 56 in FIGS. 24A and 24C represent the same gas company, the network address of the billing entity, i.e. the gas company, to which the second subscriber is linked in step 1218C is different than the network address to which the first subscriber is linked in step 1218A. Thus, in the case of the gas company, the biller retains control over all bill presentments and simply flags different users so that the EPCS will provide hyperlinks which direct different users to different biller network addresses as desired by the biller. Here again, the billing entity 56 messages the EPCS entity 58 to log the "view bill" request event in step 1220C. The billing entity 56 also presents detailed bill data to the user entity 52 in step 1222C, however, as will be described in greater detail below, the presentations made to the subscriber linked to the primary network address of the gas company and to the subscriber linked to the secondary network address of the gas company will be different.

Figure 24D:
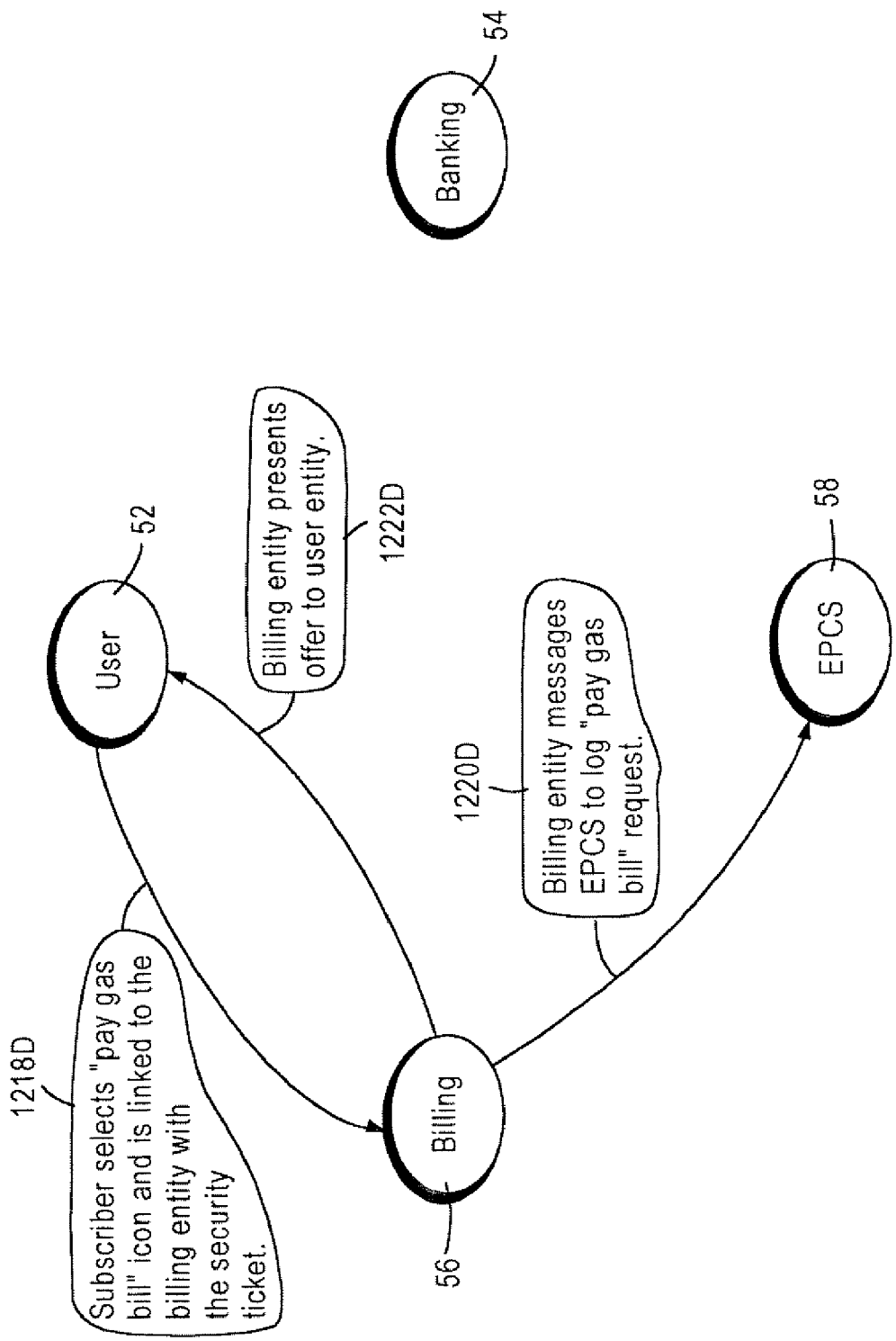
FIG. 24D is a flowchart diagram showing message flows between a user entity, a billing entity, and an EPCS entity in the electronic bill presentment and payment system shown in FIG. 4 for the first subscriber directing payment of a bill identified in FIG. 23C, in accordance with the present invention.

In FIG. 24D, which is similar to FIG. 24A, the first subscriber selects, e.g. clicks-on, the "pay bill" icon 1155 after highlighting the "gas bill" in the bill summary information shown in FIG. 23C. Although, as discussed above, the payment instruction will be processed by the EPCS, the first subscriber is automatically linked to a network address at the billing entity 56, with the security ticket, in step 1218D. The billing entity 56 messages the EPCS entity 58 to log the "pay bill" request event in step 1220D. The EPCS 58 may initiate processing of the pay instruction based upon this message from the billing entity 56 or based upon some other message, as will be recognized by those skilled in the art. The billing entity 56 presents a special promotional offer to the user entity 52 in step 1222D. Hence, even though the user has not requested detailed bill information from the biller, the user is forced to the billing entity for presentation of promotional information, as may be desired by the biller, without presenting the detailed bill. It will of course be recognized that the first subscriber can be forced to any biller whose bill is shown to be available in FIG. 23C, as may be desirable under the circumstances, whenever the user clicks on the "pay bill" icon to direct payment of that biller's bill.

Figure 25A:
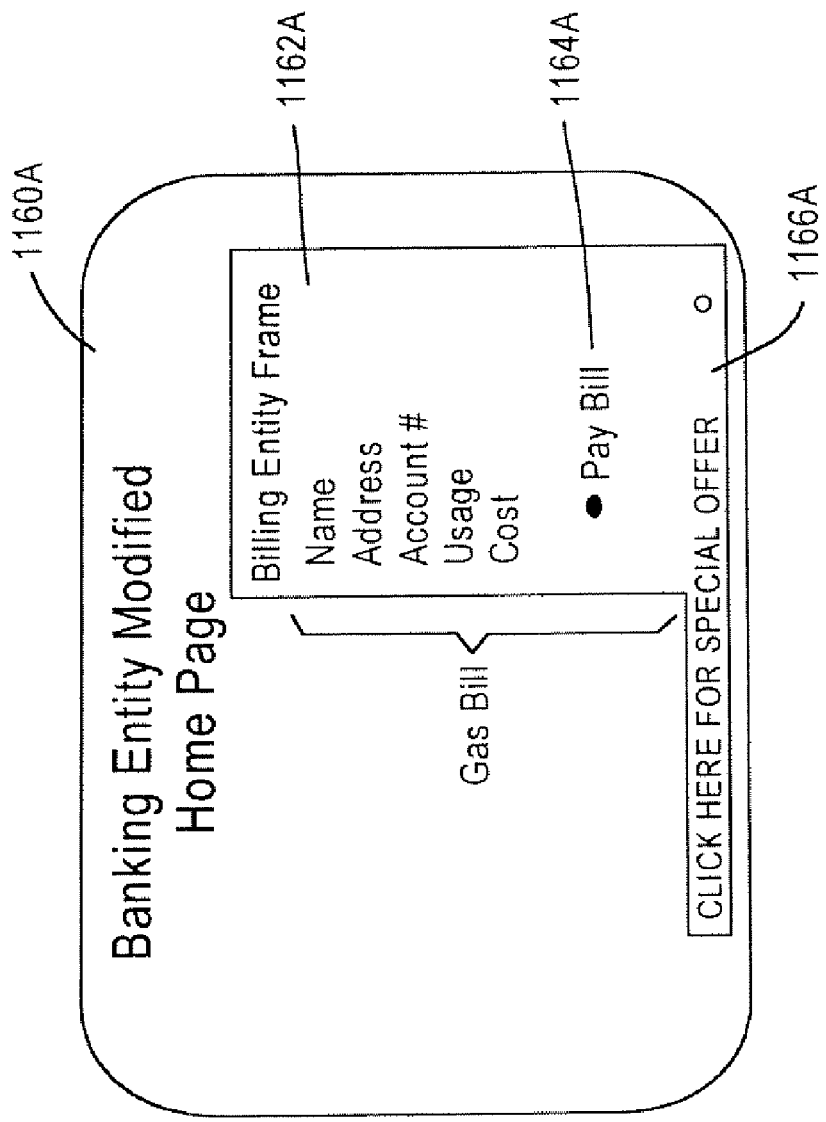
FIG. 25A shows another modified banking entity home page having a billing entity frame presenting detailed bill data and special promotional information to the first subscriber, in accordance with the present invention.

FIG. 25A shows a home page 1160A having a billing entity frame 1162A presenting the detailed gas bill data to the first subscriber, after a "view bill" request. The home page 1160A includes, within frame 1162A, the subscriber name, subscriber address, account number, usage, and cost, and a "pay bill" icon 1164A. As shown in FIG. 25A, billing entity frame 1162A also includes an icon 1166A which can be clicked on to present special targeted promotional information, e.g. a special discount offer, survey or software upgrade etc., to the first subscriber. The first subscriber may also be provided with other general promotional information, such offers as which are being generally made to all gas company customers. Hence, a rich presentation is provided to the first subscriber.

Figure 25B:
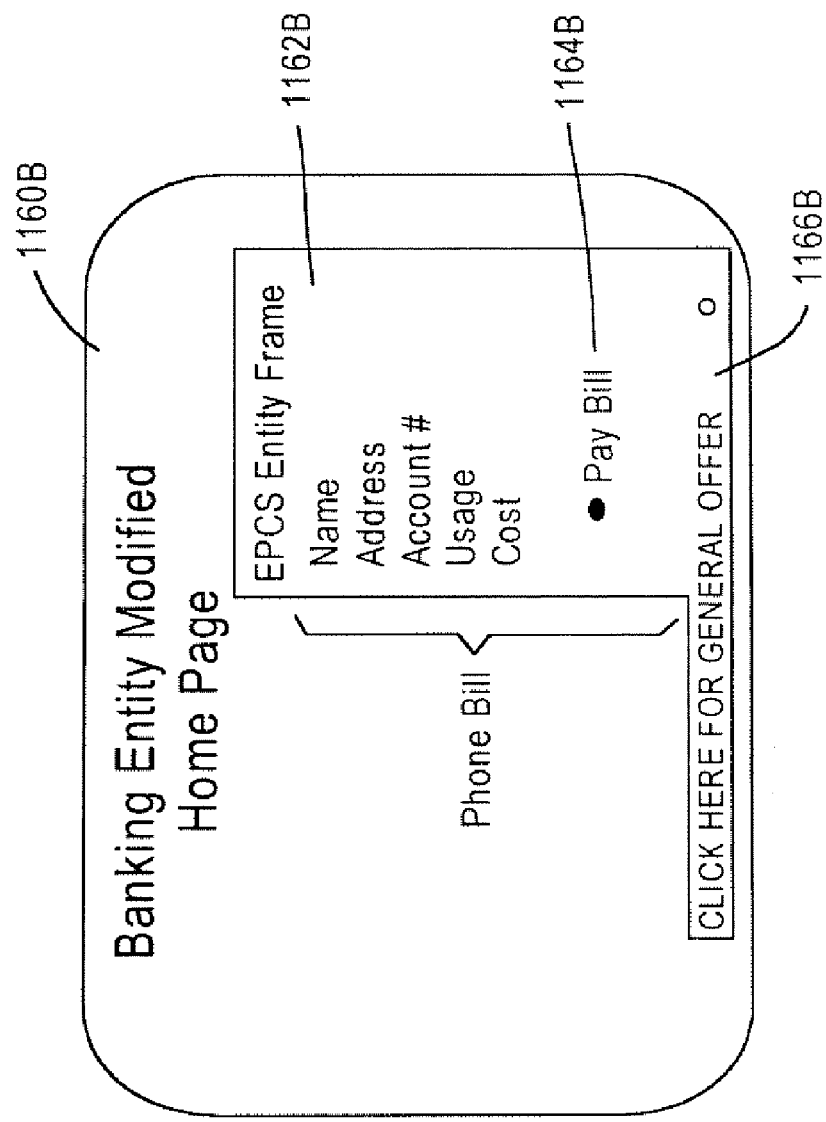
FIG. 25B shows another modified banking entity home page having an EPCS entity frame presenting detailed bill data and general promotional information to the first subscriber, in accordance with the present invention.

FIG. 25B shows a home page 1160B having an EPCS entity frame 1162B presenting the detailed phone bill data to the first subscriber, after a "view bill" request. The home page 1160B includes, within frame 1162B, the same information included in frame 1162A of FIG. 25A. However, the FIG. 25B home page 1160B does not include the special targeted information for presentation to the first subscriber. Rather, the EPCS entity frame 1162B only includes an icon 1166B which can be clicked on to present general, typically untargeted, promotional information, e.g. a general offer to install an additional phone line within a facility, to the first subscriber. Hence, a more basic presentation is provided to the first subscriber.

Figure 25C:
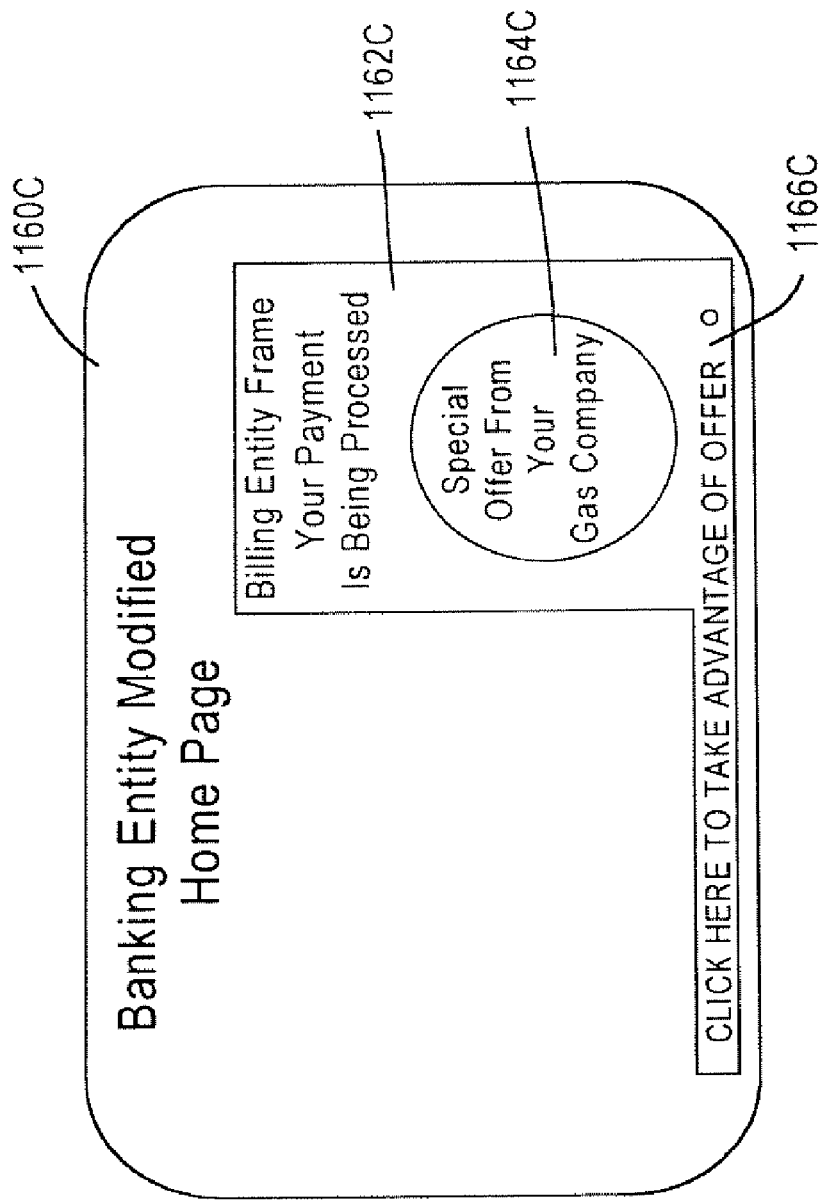
FIG. 25C shows another modified banking entity home page having a billing entity frame presenting only promotional information to the first subscriber, in accordance with the present invention.

FIG. 25C shows a home page 1160C having a billing entity frame 1162C presenting a description of a special promotional offering by the gas company to the first subscriber, without the presentation of detailed billing information, after a "pay bill" request is entered during presentation of the bill availability information. It should be noted that the special offering could be presented with the bill even though the pay bill request has been entered, if so desired. The home page 1160C includes, within frame 1162C, a description of the special offering 1164C, a message indicating the payment is being processed, and an icon 1166C which can be clicked on to place an order for the offered product. As discussed above, a special targeted promotional offering might be described or other promotional information could, if desired, be presented to the first subscriber. The first subscriber may also be presented with a description of other offers which are being generally made to gas company customers. Hence, a rich presentation is provided to the first subscriber after a selecting "pay bill" from the EPCS presentation shown if FIG. 23C.

It will be understood that, in the case of the first subscriber, richer, targeted gas, cable and credit card bill presentations, and more basic, untargeted electric and phone bill presentations are provided by the respective billing entities 56. On the other hand, the second subscriber receives richer, targeted phone, cable and credit card bill presentations, and more basic, untargeted electric and gas bill presentations from the respective billing entities 56.

At this point it should be noted that while the foregoing detailed description was directed to an electronic bill presentment and payment technique, any number of system types can employ the distributed database entities 30 to facilitate distributed data accessing within a network in accordance with the present invention.

The present invention is not to be limited in scope by the specific embodiments described herein. Indeed, various modifications of the present invention in addition to those described herein, will be apparent to those of skill in the art from the foregoing description and accompanying drawings. Thus, such modifications are intended to fall within the scope of the appended claims.

What is claimed is:

1. A network for electronically presenting bill related information, comprising:

a central network station configured to transmit bill availability information identifying available bills of a plurality of different billers for a plurality of different users, information associated with each of the identified bills of a respective one of the plurality of different billers being available at one of a first network address associated with the respective biller and a second network address associated with the respective biller; and a plurality of different user stations, each associated with a respective one of the plurality of different users, and configured to receive the transmitted bill availability information for its associated user and to select one of the identified bills;

wherein the central network station is configured to (1) associate a first user of the plurality of different users with information to be presented with a first bill, wherein an indicator of the association is stored, and (2) in response to a first request received from the first user, determine the information to be presented with the first bill based on the indicator associated with the first user, and (3) transmit the information to be presented with the first bill to the first user, and wherein a first of the plurality of user stations, associated with the first of the plurality of different users, is linked to the first network address associated with a first of the plurality of different billers based on a first bill selection by the first user station, and a second of the plurality of user stations associated with a second of the plurality of different users is linked to the second network address associated with the first biller based on a second bill selection by the second user station.

2. A network according to claim 1, wherein:
the identified bill of the first biller for the first user is available with promotional information at the first network address, and the identified bill of the first biller for the second user is available without the promotional information at the second network address.

3. A network according to claim 1, wherein:
the transmitted bill availability information identifying the available bill of the first biller for the first user includes a hyperlink to the first network address; and
the transmitted bill availability information identifying the available bill of the first biller for the second user includes a hyperlink to the second network address.

4. A network according to claim 1, wherein:
the first user station is automatically linked to the first network address responsive to the first bill selection; and
the second user station is automatically linked to the second network address responsive to the second bill selection.

5. A network according to claim 1, further comprising:
a plurality of different biller stations, each associated with a respective one of the plurality of different billers, a first of the plurality of different biller stations being associated with the first biller;
wherein the first network address is a network address associated with the first biller station; and
wherein the second network address is a network address associated with the central processing station.

6. A network according to claim 1, wherein:
each of the plurality of user stations is further configured to display the transmitted bill availability information, to receive an input of its associated user, and to select one of the identified bills based on the received input.

7. A network according to claim 1, wherein:
the bill availability information identifies available bills without identifying an amount of each of the bills.

8. A network according to claim 1, wherein:
the bill availability information identifies the total amount of each of the available bills;
each of the plurality of different user stations is further configured to select one of the identified bills for payment; and
the first and the second user stations are respectively linked to the first and the second network addresses based on a bill selection for one of viewing and payment of the selected bill.

9. A network according to claim 8, wherein:
the information associated with each of the identified bills available at the first network address is promotional information and the information associated with each of the identified bills available at the second network address is detailed bill information.

10. A network according to claim 1, further comprising:
a database configured to store the bill availability information; and
the central network station is further configured to transmit the stored bill availability information.

11. A method of electronically distributing bill related information, comprising the steps of:
centrally receiving initial requests for bills of a plurality of different billers for a plurality of different users;
transmitting, responsive to the received initial requests, bill availability information, identifying available bills of the plurality of different billers for the plurality of different users, including a first bill of a first of the plurality of different billers for a first of the plurality of different users and a second bill of the first biller for a second of the plurality of different users;
associating the first user of the plurality of different users with information to be available with the first bill;
storing an indicator of the association;
receiving a first request relating to the identified first bill of the first biller at a first network address and a second request relating to the identified second bill of the first biller at a second network address, different than the first network address, wherein the first request is received from the first user;
in response to the first request, determining the information to be available with the first bill based on the indicator associated with the first user;
transmitting the information to be available with the first bill from the first network address responsive to the receipt of the first request; and
transmitting information associated with the second bill from the second network address responsive to the receipt of the second request.

12. A method according to claim 11, further comprising the steps of:
transmitting a first hyperlink to the first network address with the bill availability information identifying the first bill; and
transmitting a second hyperlink to the second network address with the bill availability information identifying the second bill;
wherein the first request is received at the first network address via the first hyperlink;
wherein the second request is received at the second network address via the second hyperlink.

13. A method according to claim 11, further comprising the steps of:
generating the first request based on an input of the first user;
generating the second request based on an input of the first user;
generating the second request based on an input of a second user;
automatically transmitting the generated first request to the first network address; and
automatically transmitting the second generated request to the second network address.

14. A method according to claim 11, wherein:
the bill availability information identifies available bills without identifying an amount of each of the bills.

15. A method according to claim 11, wherein:
the first request is one of a request to pay and a request to view the identified first bill and the transmitted information to be presented with the first bill includes promotional information; and
the second request is one of a request to pay and a request to view the identified second bill and the transmitted information associated with the second bill excludes the promotional information.

16. A method according to claim 11, further comprising the steps of:
centrally storing the bill availability information;
wherein the transmitted bill availability information is the stored bill availability information.

17. A system for electronically distributing bill related information, comprising:
- a memory configured to store identifiers of available bills of a plurality of different billers for a plurality of different users, and network addresses at which information associated with the identified bills is available, including a first bill identifier which identifies a first of the available bills of a first of the plurality of billers for a first of the plurality of users and a second bill identifier which identifies a second of the available bills of the first biller for a second of the plurality of users; and
- a processor configured to (1) associate the first user with information to be presented with the first bill, wherein an indicator of the association is stored, and (2) in response to a first request received from the first user, determine the information to be presented with the first bill based on the indicator associated with the first user, and (3) direct the transmission of the stored first bill identifier and the information to be presented with the first bill to the first user with a first of the network addresses, and the transmission of the stored second bill identifier to the second user with a second of the network addresses, the first network address being different than the second network address;
- wherein the information associated with the first bill is available at the first network address and the information associated with the second bill is available at the second network address.

18. A system according to claim 17, wherein:
the first network address is transmitted as a first hyperlink; and
the second network address is transmitted as a second hyperlink.

19. A system according to claim 17, wherein:
the information to be presented with the first bill and available at the first network address includes promotional information; and
the information available at the second network address excludes the promotional information.

20. A database for storing bill related information, comprising:
- identifiers of a plurality of available bills of a biller for a plurality of different users;
- an association indicator indicating a relationship between a user of the plurality of different users and information to be available with a bill of the plurality of available bills, wherein the bill is for the user;
- a network location indicator associated with the information to be available with the bill and indicating that a network location at which the information to be available with the bill is available is different than a network location at which information associated with an other of the plurality of available bills is available.

21. An article of manufacture for electronically transmitting bill related information, comprising:
- a computer readable storage medium; and
- computer programming stored on the medium and configured to be readable from the medium by a computer processor and thereby cause the processor to operate so as to:
- direct transmissions of a plurality of identifiers of available bills of a plurality of different billers for a plurality of different users, including a first of the plurality of bill identifiers which identifies a first of the available bills of a first of the plurality of different billers for a first of the plurality of different users and a second of the plurality of bill identifiers which identifies a second of the available bills of the first biller for a second of the plurality of users;
- associate the first user with information to be presented with the first available bill, wherein an indicator of the association is stored;
- in response to a first request received from the first user, determine the information to be presented to be with the first available bill based on the indicator associated with the first user, and
- direct transmissions of a plurality of different network addresses at which information associated with the identified available bills is available, including a first of the plurality of network addresses at which information to be presented with the first available bill is available to the first user, and a second of the plurality of network addresses, different than the first network address, at which information associated with the second available bill is available to the second user.

22. An article of manufacture according to claim 21, wherein:
the information to be presented with the identified first available bill includes promotional information; and
the information associated with the identified second available bill excludes the promotional information.

23. An article of manufacture according to claim 21, wherein the stored computer programming is readable by the computer processor to thereby cause the processor to further operate so as to:
direct the transmission of the first network address as a first hyperlink in association with the transmission of the first bill identifier; and
direct the transmission of the second network address as a second hyperlink in association with the transmission of the second bill identifier.

24. An article of manufacture according to claim 21, wherein the identified first available bill is available at the first network address and the second available bill is available at the second network address.

* * * * *